United States Patent [19]
Weaver, Jr. et al.

[11] Patent Number: 5,715,526
[45] Date of Patent: Feb. 3, 1998

[54] APPARATUS AND METHOD FOR CONTROLLING TRANSMISSION POWER IN A CELLULAR COMMUNICATIONS SYSTEM

[75] Inventors: Lindsay A. Weaver, Jr., Boulder, Colo.; Robert Wright Boesel, San Diego, Calif.

[73] Assignee: Qualcomm Incorporated, San Diego, Calif.

[21] Appl. No.: 525,899

[22] Filed: Sep. 8, 1995

[51] Int. Cl.$^6$ .............................. H01Q 11/12; H04B 1/04
[52] U.S. Cl. ................................ 455/126; 455/103
[58] Field of Search ........................ 455/53.1, 54.1, 455/56.1, 69, 13.4, 127, 126, 115, 102, 103, 13.1; 330/136, 279, 129

[56] References Cited

U.S. PATENT DOCUMENTS

| | | | |
|---|---|---|---|
| 5,056,109 | 10/1991 | Gilhousen | 375/1 |
| 5,099,204 | 3/1992 | Wheatley, III | 330/279 |
| 5,107,225 | 4/1992 | Wheatley, III et al. | 330/279 |
| 5,257,283 | 10/1993 | Gilhousen et al. | 375/1 |
| 5,265,119 | 11/1993 | Gilhousen et al. | 375/1 |
| 5,267,262 | 11/1993 | Wheatley, III | 375/1 |
| 5,283,536 | 2/1994 | Wheatley, III et al. | 330/279 |
| 5,416,441 | 5/1995 | Nagano | 455/126 |
| 5,432,473 | 7/1995 | Mattila et al. | 455/126 |
| 5,530,920 | 6/1996 | Takeda | 455/102 |
| 5,566,363 | 10/1996 | Senada | 455/115 |
| 5,606,285 | 2/1997 | Wang et al. | 455/126 |

*Primary Examiner*—Reinhard J. Eisenzopf
*Assistant Examiner*—Marsha D. Banks-Harold
*Attorney, Agent, or Firm*—Russell B. Miller; Sean English

[57] ABSTRACT

An apparatus and method for controlling a final transmit power, y, of a base station in a cellular communications system that has several channels. The base station has a transmit power tracking gain, y', and a radio frequency transmit power, w. The apparatus comprises channel elements for calculating expected powers, $P_{k,a}$–$P_{k,i}$, each of which corresponds to a channel. The apparatus also comprises a transceiver system controller (BTSC) for generating a desired output power, $y_d$, of the base station, including an adder for summing the expected powers. The apparatus also includes a transmit power detector for measuring y to obtain a measured transmit power. The apparatus further comprises a radio frequency interface card (RFIC) for generating y'. Finally, the apparatus includes a gain unit for processing y' and w to obtain the final transmit power, y.

35 Claims, 10 Drawing Sheets

APPARATUS AND METHOD FOR CONTROLLING TRANSMISSION POWER IN A CELLULAR COMMUNICATIONS SYSTEM

BACKGROUND OF THE INVENTION

I. Field of the Invention

The present invention relates to communications systems. More particularly, the present invention relates to an apparatus and method for controlling the forward link transmit power in a cell-site base station in a cellular communications system by providing a transmit power tracking loop in the transmit chain of the base station.

II. Description of the Related Art

In a wireless telephone communication system, many users communicate over a wireless channel to connect to wireline telephone systems. Communication over the wireless channel can be one of a variety of multiple access techniques which facilitate a large number of users in a limited frequency spectrum. These multiple access techniques include time division multiple access (TDMA), frequency division multiple access (FDMA), and code division multiple access (CDMA). The CDMA technique has many advantages and an exemplary CDMA system is described in U.S. Pat. No. 4,901,307 entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a remote unit, communicate through satellite repeaters or terrestrial base stations using CDMA spread spectrum communication signals. In using CDMA communications, the frequency spectrum can be reused multiple times thus permitting an increase in system user capacity.

The CDMA modulation techniques disclosed in the '307 patent offer many advantages over narrow band modulation techniques used in communication systems using satellite or terrestrial channels. The terrestrial channel poses special problems to any communication system particularly with respect to multipath signals. The use of CDMA techniques permits the special problems of the terrestrial channel to be overcome by mitigating the adverse effect of multipath, e.g. fading, while also exploiting the advantages thereof.

Terrestrial cellular communications systems include a number of base stations that communicate with remote subscriber units. A "forward link" designates the link of communications from a base station to a remote unit. A "reverse link" designates the link of communications from a remote unit to a base station. Therefore, signals sent from a base station to a remote unit travel on the forward link, while signals sent in the opposite direction travel on the reverse link.

In a CDMA cellular telephone system, the same frequency band can be used for communication in all base stations. At the base station and remote unit receivers, separable multipath, such as a line of site path and another path reflecting off of a building, can be diversity combined for enhanced modem performance. The CDMA waveform properties that provide processing gain are also used to discriminate between signals that occupy the same frequency band. Furthermore the high frequency pseudonoise (PN) modulation allows many different propagation paths of the same signal to be separated.

The forward link CDMA channel may include a variety of code channels such as a Pilot Channel, a Synchronization Channel, a number of Paging Channels, and a number of Forward Traffic Channels. In the exemplary embodiment, each of the code channels is orthogonally spread by a Walsh sequence and by a quadrature pair of pseudo-noise sequences at a fixed chip rate of 1.2288 megachips/second (Mcps). For more information on the forward link CDMA channels of the preferred embodiment and CDMA in general, see "Mobile Station-Base Station Compatibility Standard for Dual-Mode Wideband Spread Spectrum Cellular System," TIA/EIA/IS-95.

In the IS-95 CDMA system, the data that is communicated between a base station and remote unit is formatted into frames. Frame formatted data communication can occur at a plurality of data rates. For example, the CDMA Paging Channel typically operates at a fixed data rate operation such as 9600 or 4800 bits per second ("bps") while the Forward Traffic Channel supports variable data rate operation at 9600, 4800, 2400, and 1200 bps.

Each base station in the cellular system has a forward link (transmit) power level and a reverse link (receive) power level. The transmit power level is the power of the signal being radiated by the base station to the remote units and the overhead channels. The transmit power level is set by various electronic components that comprise the base station's transmit chain. The receive power level is the power of all the signals being received by the base station. The receive power level is dependent on several factors, including the number of remote units communicating with the base station, the strength of the signals they are producing, and any other noise or interference received by the base station such as remote units in the proximity of the coverage area of the base station which are in communication with neighboring base stations.

Each base station in the cellular system has a forward link coverage area and a reverse link coverage area. These coverage areas define the physical boundary beyond which base station communication with a remote unit is degraded. In other words, if a remote unit is within the base station's coverage area, the remote unit can communicate with the base station, but if the remote unit is beyond the coverage area, communications are compromised. A base station may have single or multiple sectors. Single sectored base stations have approximately a circular coverage area. Multi-sectored base stations have independent coverage areas that form lobes radiating from the base station. Multi-sectored base stations typically include multiple independent transmit and receive antennas as well as independent processing circuitry.

Base station coverage areas have two handoff boundaries. A handoff boundary is defined as the physical location between two base stations where the link would perform the same regardless of whether the remote unit were communicating with the first or second base station. Each base station has a forward link handoff boundary and a reverse link handoff boundary. The forward link handoff boundary is defined as the location where the remote unit's receiver would perform the same regardless of which base station it was receiving. The reverse link handoff boundary is defined as the location of the remote unit where two base station receivers would perform the same with respect to that remote unit.

Ideally these boundaries should be balanced, meaning that they should have the same physical location. If they are not balanced, system capacity may be reduced as the power control process is disturbed or the handoff region unreasonably expands. Note that handoff boundary balance is a function of time, in that the reverse link coverage area shrinks as the number of remote units present therein increases. Reverse link power, which increases with each additional remote unit, is inversely proportional to the reverse link coverage area. An increase in receive power decreases the effective size of the reverse link coverage area of the base station and causes the reverse link handoff boundary to move inward toward the base station.

To obtain high performance in a CDMA or other cellular system, it is important to carefully and accurately control the transmit power level of the base stations and remote units in the system. Transmit power control limits the amount of self-interference produced by the system. Moreover, on the forward link, a precise level of transmit power can serve to balance the forward and reverse link handoff boundaries of a base station or a single sector of a multi-sectored base station. Such balancing helps to reduce the size of the handoff regions, increase overall system capacity, and improve remote unit performance in the handoff region.

Failure to control transmit power level in cellular and other wireless communications systems may damage communication quality. In an actual system, each remote unit may transmit the minimum signal level that produces a signal-to-noise ratio that allows acceptable data recovery. If a signal transmitted by a remote unit arrives at the base station receiver at a power level that is too low, the bit-error-rate may be too high to permit high quality communications due to interference from other remote units. On the other hand, if the remote unit transmitted signal is at a power level that is too high when received at the base station, communication with this particular remote unit is acceptable, but this high power signal acts as interference to other remote units.

Therefore, to maximize capacity in an exemplary CDMA spread spectrum system, the transmit power of each remote unit in communication with a base station is controlled by the base station to produce the same nominal received signal power at the base station. In the ideal case, the total signal power received at the base station is equal to the nominal power received from each remote unit, multiplied by the number of remote units transmitting within the coverage area of the base station, plus the power received at the base station from remote units in the coverage area of neighboring base stations.

Path loss in the radio channel is defined as any degradation or loss suffered by a signal as it travels over-the-air. Path loss can be characterized by two separate phenomena— average path loss and fading. The forward link operates on a different frequency than the reverse link. Nevertheless, because the forward and reverse link frequencies are within the same frequency band, a significant correlation exists between the average path loss of the two links. On the other hand, fading is an independent phenomenon for the forward and reverse links and varies as a function of time. The characteristics of fading on the channel are the same, however, for both the forward and reverse link because the frequencies are within the same frequency band. Therefore, the average of channel fading over time for both links is typically the same.

In an exemplary CDMA system, each remote unit estimates the path loss of the forward link based on the total power received at the remote unit. The total power is sum of the power from all base stations operating on the same frequency assignment as perceived by the remote unit. From the estimate of the average forward link path loss, the remote unit sets the transmit power level of the reverse link signal.

Remote unit transmit power is also controlled by one or more base stations. Each base station with which the remote unit is communicating measures the received signal strength from the remote unit. The measured signal strength is compared to a desired signal strength level for that particular remote unit at that base station. A power adjustment command is generated by each base station and sent to the remote unit on the forward link. In response to the base station power adjustment commands, the remote unit increases or decreases its transmit power by a predetermined amount.

When a remote unit is in communication with more than one base station, power adjustment commands are provided from each base station. The remote unit acts upon these multiple base station power adjustment commands to avoid transmit power levels that may adversely interfere with other remote unit communications and yet provide sufficient power to support communication from the remote unit to at least one of the base stations. This power control mechanism is accomplished by having the remote unit increase its transmit power level only if every base station with which the remote unit is communicating requests an increase in power level. The remote unit decreases its transmit power level if any base station with which the remote unit is communicating requests that the power be decreased. A system for base station and remote unit power control is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM" and assigned to the assignee of the present invention.

It is also desirable to control the relative power used in each data signal transmitted by the base station in response to control information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB additional signal power from the active base station to achieve adequate performance.

At other times, the remote unit may be located where the signal-to-interference ratio is unusually good. In such a case, the base station could transmit the desired signal using a lower than normal transmitter power, reducing interference to other signals being transmitted by the system.

To achieve the above objectives, a signal-to-interference measurement capability can be provided within the remote unit receiver. This measurement is performed by comparing the power of the desired signal to the total interference and noise power. If the measured ratio is less than a predetermined value, the remote transmits a request to the base station for additional power on the forward link signal. If the ratio exceeds the predetermined value, the remote unit transmits a request for power reduction. One method by which the remote unit receiver can monitor signal-tointerference ratios is by monitoring the frame error rate (FER) of the resulting signal.

The base station receives the power adjustment requests from each remote unit and responds by adjusting the power allocated to the corresponding forward link signal by a predetermined amount. The adjustment would usually be small, typically on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

The base station should also consider the power demands being made by other remote units in deciding whether to comply with the requests of any particular remote unit. For example, if the base station is loaded to capacity, requests for additional power may be granted, but only by 6% or less, instead of the normal 12%. In this regime, a request for a reduction in power would still be granted at the normal 12% change.

Conventional base stations, however, do not have the ability to provide accurate control over their transmit power level. To do so, it is necessary to compensate for variations in the gain in the various components comprising the transmit chain of the base station. Variations in the gain typically occur over temperature and aging such that a simple calibration procedure does not guarantee a precise level of output transmit power over time. Variations in the gain can be compensated by adjusting the overall gain in the transmit chain so that the actual transmit power of the base station matches a calculated desired transmit power. Conventional base stations are not equipped with apparatus that can perform this function and thus lack the capacity to limit self-interference and to balance their forward and reverse link handoff boundaries.

Therefore, a need exists for an apparatus and method for accurately controlling the transmit power level of a base station signal comprised of a plurality of different signal channels.

SUMMARY OF THE INVENTION

Accordingly, the present invention is directed to an apparatus and method for controlling the transmit power of base station in a cellular system that limits self-interference, helps to balance forward and reverse link handoff boundaries, and that substantially obviates one or more of the problems due to the limitations and disadvantages of the related art.

Additional features and advantages of the invention will be set forth in the description that follows and in part will be apparent from the description, or may be learned by practice of the invention. The objectives and other advantages of the invention will be realized and attained by the apparatus particularly pointed out in the written description and claims of this application, as well as the appended drawings.

To achieve these and other advantages, and in accordance with the purpose of the invention as embodied and broadly described herein, the present invention defines an apparatus for controlling a final transmit power, of a base station in a cellular communications system. The cellular communications system has several channels which operate at a variety of data rates and relative signal levels which combined create a raw radio frequency transmit signal, w. The apparatus comprises channel elements, each of which corresponds to a channel, for calculating expected powers each channel signal used to create the raw radio frequency transmit signal, w. The apparatus also comprises a base station transceiver system controller (BTSC) for generating a desired output power, $y_d$, of the base station by summing the expected powers. The apparatus also comprises a transmit power detector for measuring the power of a final output signal, $w_o$. The apparatus comprises a radio frequency interface card (RFIC) for processing the measured power to produce the final transmit power, y, for comparison to the desired output power $y_d$ and produces the transmit power tracking gain y'. The apparatus further comprises a variable gain unit receiving w for amplification according to y'.

In still another aspect, the present invention defines an apparatus for controlling a final transmit power, y, of a base station in a cellular communications system comprising a breathing mechanism or other transmit power effecting mechanism which operates on the total raw radio frequency transmit signal, w, rather than on each individual channel from the channel elements.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

DETAILED DESCRIPTION OF THE INVENTION

Figure 1:
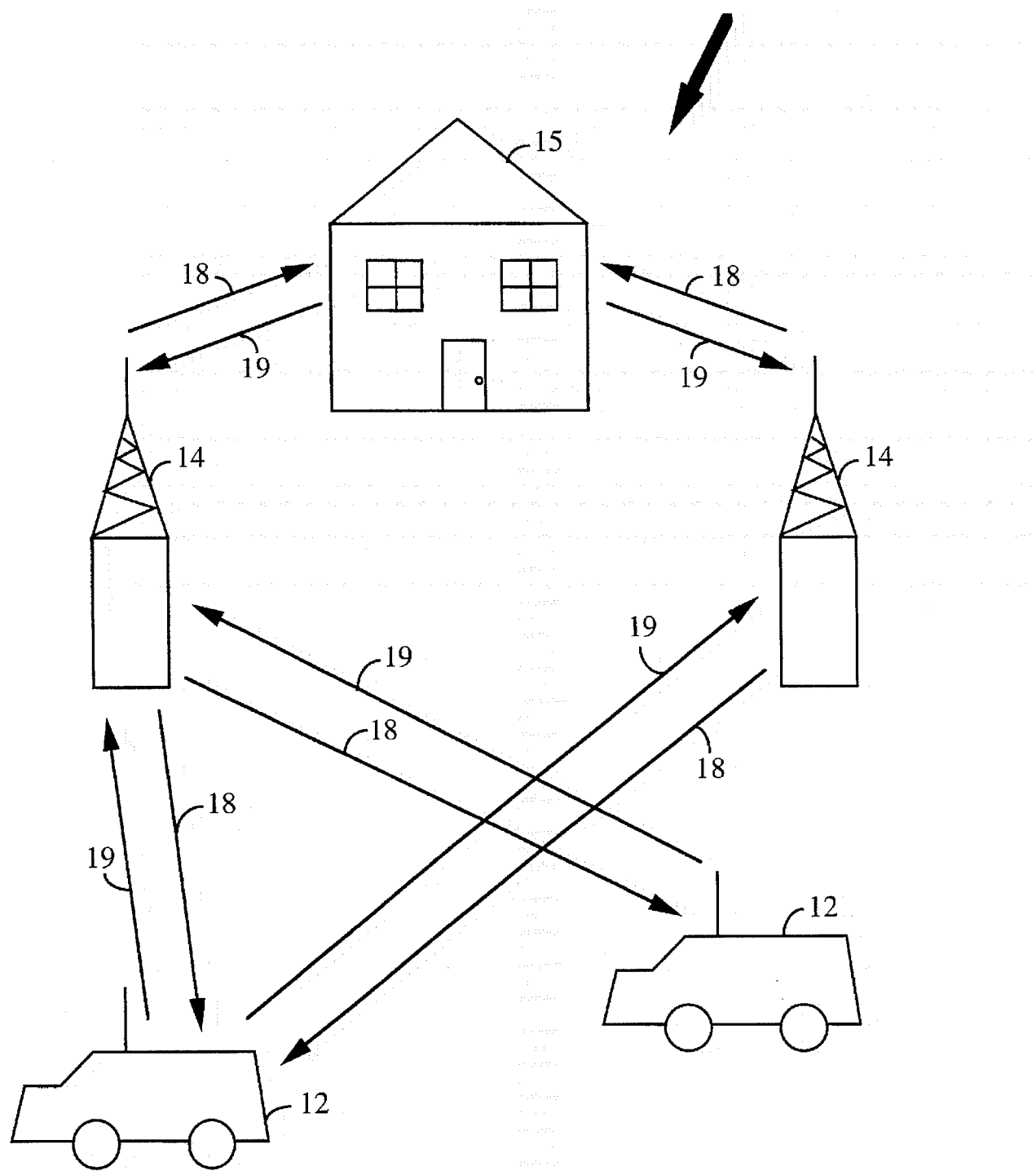
FIG. 1 is an overview of an exemplary cellular telephone system.

Reference will now be made in detail to the present preferred embodiment of the invention, an example of which is illustrated in the accompanying drawings. Wherever possible, the same reference numerals will be used throughout the drawings to refer to the same or like parts.

In accordance with the present invention, an apparatus and method are provided for controlling the final transmit power of a base station in a cellular communications system. The present invention comprises channel elements for calculating expected powers. It also comprises a base station transceiver system controller (BTSC) for generating a desired output power of the base station, as well as a transmit power detector for measuring the previous final transmit power of the base station to obtain a measured transmit power. Finally, the invention comprises a radio frequency interface card (RFIC) for generating the final transmit power.

As described above, a base station may be single- or multi-sectored. The present invention applies equally to each sector of a sectorized base station and to single sectored independent base stations. For the remainder of this description, therefore, the term "base station" can be assumed to refer to either a sector of a multi-sectored base station or a single sectored base station.

An exemplary embodiment of a terrestrial cellular telephone system in which the present invention may be embodied is illustrated in FIG. 1 and is designated generally by reference numeral 10. The system illustrated in FIG. 1 may utilize time division multiple access (TDMA), code division multiple access (CDMA), or other modulation techniques in communications between the remote units 12 and the base stations 14. Cellular systems in large cities may have many thousands of remote units 12 and many hundreds of base stations 14. Nevertheless, the present system may be used to connect fixed position or mobile cellular communications devices. For example, remote unit 15 may communicated through an in building network through a fixed antenna on the roof of the building. Transmissions from base stations 14 to remote units 12 and remote unit 15 are sent on forward links 18, while transmissions in the opposite direction are sent on reverse links 19.

Figure 2:
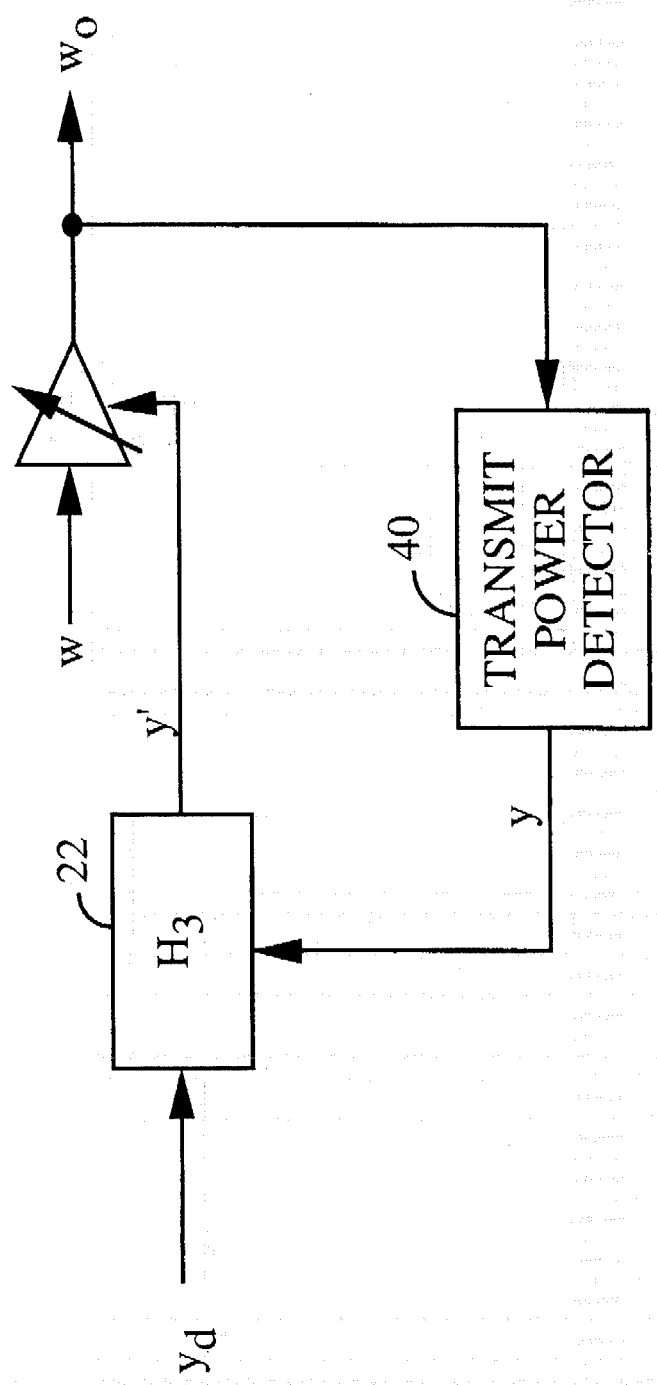
FIG. 2 is a block diagram illustrating a basic model for a transmit power tracking loop of the present invention.

With reference to FIG. 2, a basic model for the transmit power tracking loop of the base station of the present invention will be described. In FIG. 2, all powers are shown in decibels relative to 1 milliWatt (dBm) and all gains in decibels (dB). Discrete time $H_3$ filter 22 receives $y_d$ indicative of the desired output in dBm and y indicative of the actual output power in dBm. $H_3$ filter 22 filters the two inputs to produce y' indicative of the transmit power tracking gain in dB. Transmit power tracking gain y' is input to variable gain block 24, which receives the raw radio frequency transmit signal, w, and produces final output signal, $w_o$. Transmit power detector 40 measures the power of final output signal, $w_o$, to produce final transmit power indication, y. In the preferred embodiment, $H_3$ filter 22 is a standard digital filter having an infinite impulse response (IIR) for which a variety of constructions are well known in the art and may be implemented within a microprocessor. Transmit power detector 40 comprises both analog and digital components. Transmit power detector 40 receives an RF signal and produces the digital indication of final transmit power, y.

Figure 3:
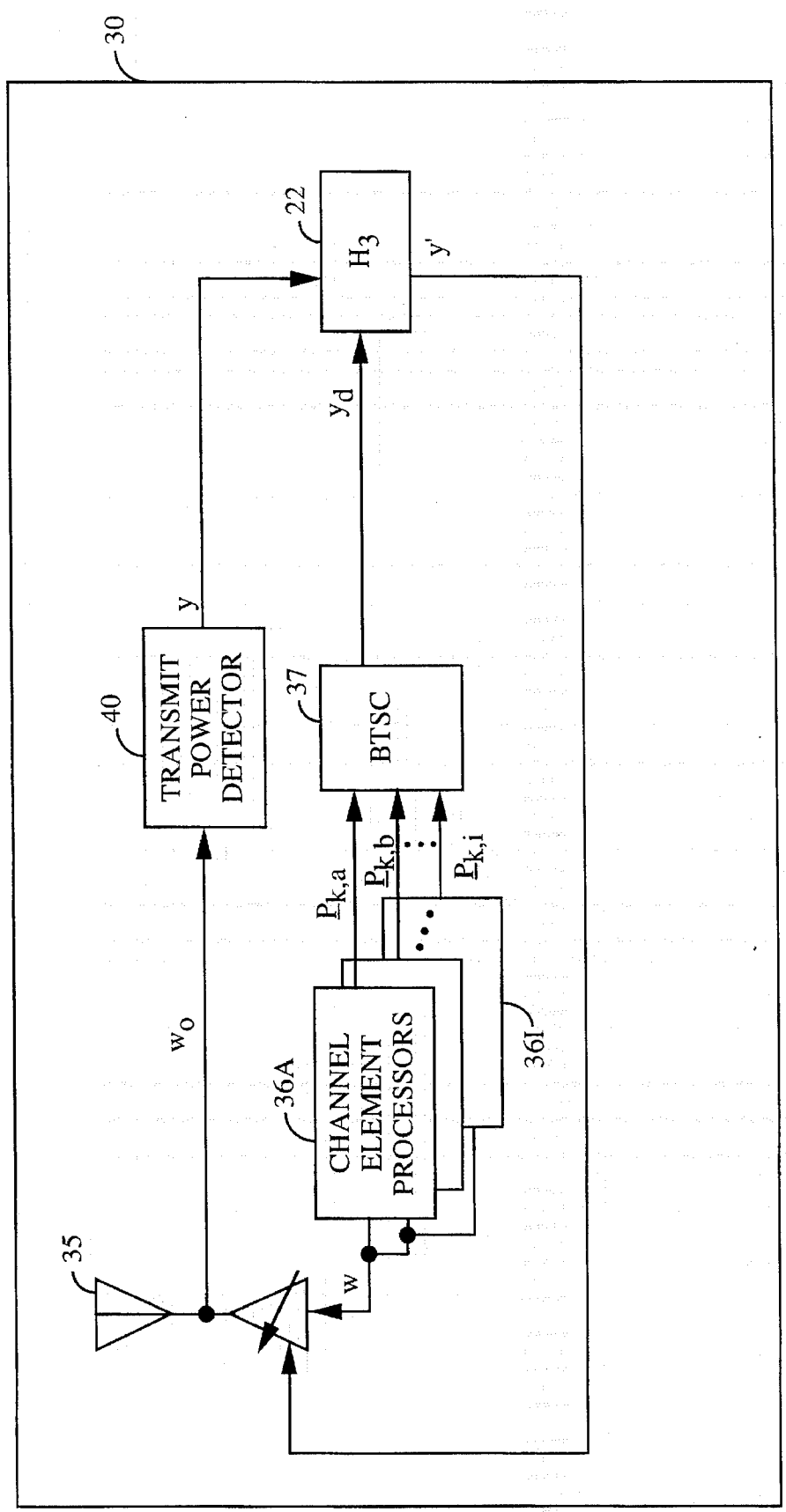
FIG. 3 is a block diagram of the receive and transmit paths of the base station apparatus in accordance with the present invention.

With reference to FIG. 3, the apparatus of the present invention for controlling the transmit power of base station 30 will now be described. Base station 30 has transmit path 31. Transmit path 31 includes transmit antenna 35, channel element processors 36a–36i, base station transceiver system controller (BTSC) 37, and transmit power detector 40.

The final output signal, $w_o$, to be transmitted to the remote units is radiated from transmit antenna 35. Transmit power detector 40 measures the transmit power of the final output signal, $w_o$, at the output of the base station at a point in time, t, thereby determining the actual transmit power y at that time. The measurement made at the output of the base station is the sum of all signals transmitted from the base station at a common frequency band.

In digital communications systems, particularly those that employ spread spectrum modulation, a transmitter may employ a vocoding system that encodes voice information at a variable rate. The use of a variable data format reduces the level of interference caused by the transmitted signal to receivers other than the intended receiver. At the intended receiver, or otherwise associated with the intended receiver, a vocoding system is employed for reconstructing the voice information. In addition to voice information, non-voice information alone or a mixture of the two may be transmitted to the receiver.

A vocoder suited for application in this environment is described in copending U.S. Pat. No. 5,414,796, entitled "VARIABLE RATE VOCODER," issued May 9, 1995 and assigned to the assignee of the present invention. The disclosed vocoding system uses digital samples of the voice information to produce encoded data at four different rates, e.g., approximately 8000 bits per second (bps), 4000 bps, 2000 bps, and 1000 bps, based on voice activity during a 20 millisecond (ms) frame. Each frame of vocoder data is formatted with overhead bits as 9600 bps, 4800 bps, 2400 bps, and 1200 bps data rate frames. The highest rate data frame that corresponds to a 9600 bps frame is referred to as a "full rate" frame; a 4800 bps data frame is referred to as a "half rate" frame; a 2400 bps data frame is referred to as a "quarter rate" frame; and a 1200 bps data frame is referred to as an "eighth rate" frame. In neither the encoding process nor the frame formatting process is rate information included in the data.

Additional details on the formatting of the vocoder data into data frames are described in copending U.S. patent application Ser. No. 08/117,279, entitled "METHOD AND APPARATUS FOR THE FORMATTING OF DATA FOR TRANSMISSION," filed Sep. 7, 1993 and assigned to the assignee of the present invention. The data frames may be further processed, spread spectrum modulated, and transmitted as described in U.S. Pat. No. 5,103,459, entitled "SYSTEM AND METHOD FOR GENERATING WAVEFORMS IN A CDMA CELLULAR TELEPHONE SYSTEM," and assigned to the assignee of the present invention, the disclosure of which is incorporated herein by reference.

A mixture of voice and non-voice data may be formatted into a 9600 bps transmission frame when less than full-rate vocoder data is provided. The mode bit and additional overhead bits are included in this type of frame to indicate the rate at which the voice data is encoded. Regardless of the rate of the voice data in this type of frame, the frame as received is determined to be a 9600 bps frame that contains less than full-rate vocoder data. As such, the overhead bits are used to override the output of a full-rate frame indication to the vocoder for processing of the portion of the bits in the frame that corresponds to the less than full-rate frame vocoder data. Furthermore, it should be understood that the vocoder data may be replaced in a full-rate transmission frame by non-voice data. Again, in this case overhead bits included in the frame identify the frame as this type. The rate used to determine the desire transmit power as described below is always the effective rate of the voice and data communications combined. For example, if the vocoder produces a half rate frame and the remainder of the frame is filled with non-voice data, a full rate indication is used to determine desired output power, $y_d$.

Each frame of symbol data is interleaved by an interleaver, preferably on a bit level basis, to increase time diversity for purposes of error correction. For those frames corresponding to a data rate less than the highest data rate, e.g., 9600 bps, a modulator repeats symbol data to maintain a constant symbol rate for the frame. In other words, if the rate selected by the vocoder is less than that which corresponds to a 9600 bps frame rate, the modulator repeats the symbols to fill the frame. The number of repeats is, of course, dependent on the data rate. For a frame corresponding to a 9600 bps data rate, all symbols are provided by the modulator in an interleaved data frame. For a frame corresponding to a 4800 bps data rate, however, the modulator provides the symbols twice in an interleaved data frame. Similarly, for frames corresponding to 2400 bps and 1200 bps data rates, the modulator respectively provides the symbols four times and eight times into an interleaved data frame. The power in the each frame is scaled according to the data rate. For example, if a half rate frame is sent, each symbol is repeated twice within the frame but the total power of the frame is reduced by one half of that which would be used for a full rate frame.

The frames of symbol data are bi-phase shift key ("BPSK") modulated with orthogonal covering of each BPSK symbol along with quadrature phase shift key ("QPSK") spreading of the covered symbols as disclosed in U.S. Pat. No. 5,103,459. On the forward link, the modulator transmits the frame as a continuous stream of modulated symbol data with the power of each transmitted frame reduced according to the symbol repetition in the frame.

Referring again to FIG. 3, each channel element processor 36a–36i calculates respectively a filtered expected power, $P_{k,a}$–$P_{k,i}$. Each channel element processor 36a–36i produces information for one phone call on a Traffic Channel or produces information for one of the overhead channels such as the Pilot Channel, Paging Channels, and Synchronization Channels. As noted above, each Traffic Channel call may switch between one of four data rates on a frame by frame basis dependent on voice and data activity in the preferred embodiment. In the preferred embodiment the rates are full rate, half rate, quarter rate, and eighth rate. The data rate on a Traffic Channel directly affects the amount of power contributed by the channel element to the overall desired power in that an eighth rate frame is transmitted at ⅛ the power of a corresponding full rate frame.

The filtered expected power, $P_{k,a}$–$P_{k,i}$ is then output from each channel element processor 36a–36i and input to BTSC 37, which generates an indication of the desired output power, $y_d$, of the base station 30. BTSC 37 includes an adder for summing the plurality of filtered expected powers, $P_{k,a}$–$P_{k,i}$. The indication of the desired output power, $y_d$, and the actual transmit power, y, measured by transmit power detector 40 are then input to $H_3$ filter 22. Processing $y_d$ and y, $H_3$ filter 22 generates the transmit power tracking gain, y', of the base station 30.

Figure 4:
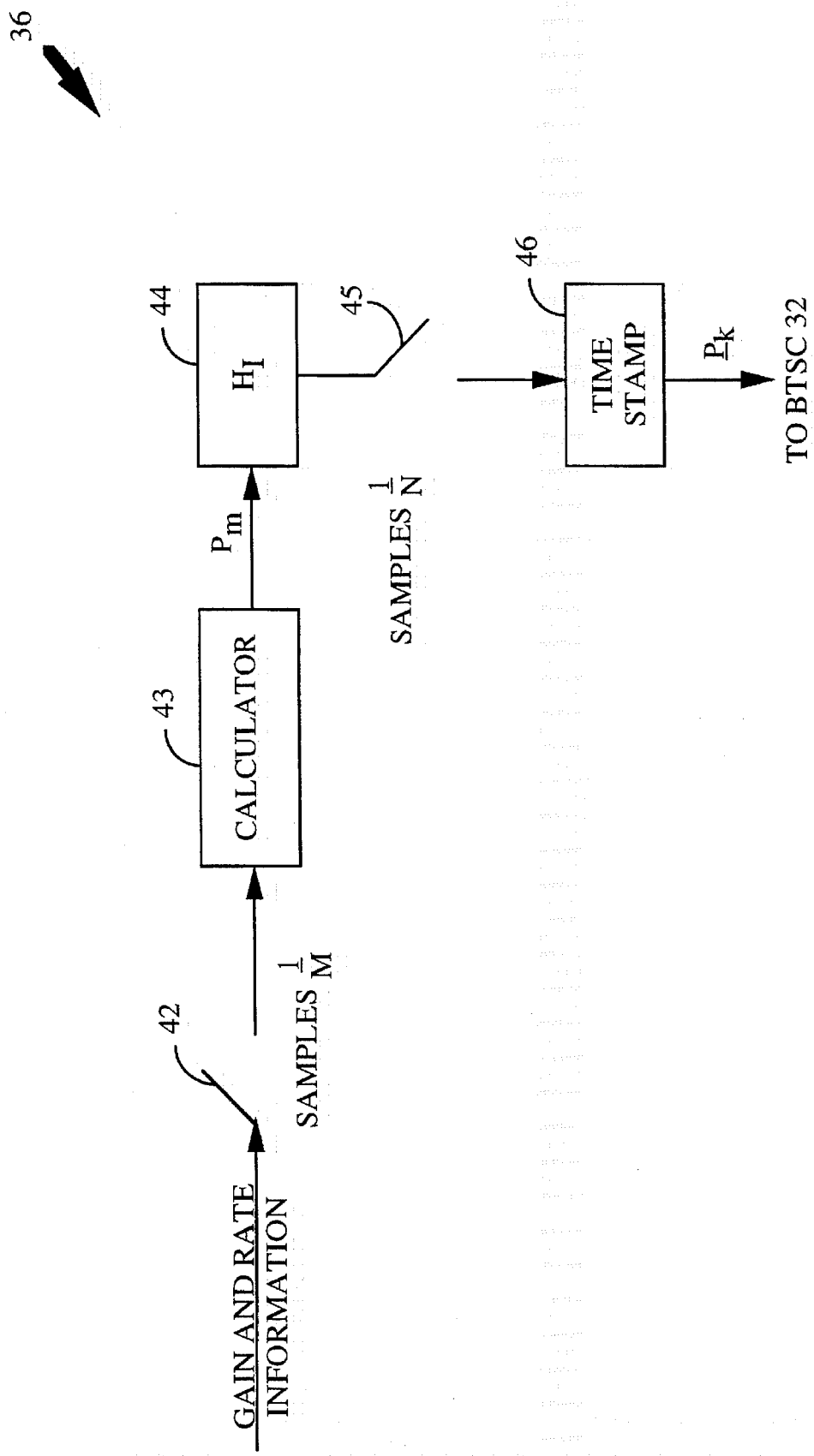
FIG. 4 is a block diagram of a channel element component in the transmit path of the base station of the present invention.

With reference to FIG. 4, the elements comprising each channel element processor 36a–36i will be described. Each of the channels has a Forward Channel Gain, $G_t$, a Power Control Subchannel Gain, $G_s$, a Channel Data Rate, $r_t$, and a Power Control Subchannel Data Rate, $r_s$. Each channel element processor 36a–36i includes calculator 43. Calculator 43 is a digital calculator which may be part of an application specific integrated circuit (ASIC) or it may be implemented within a general microprocessor. For each channel in the system, calculator 43 calculates the expected transmit power in units of bits squared of a given traffic channel frame, $P_{frame, i}$, according to the following equation:

$$P_{frame, i} = s_d(G_t^2 \times r_t)/(s_d+s_{pc}) + s_{pc}(G_s^2 \times r_s)/(s_d+s_{pc}) \quad \text{Eq.1}$$

where $s_d$ is the number of data bearing symbols per frame; and $s_{pc}$ is the number of power control information symbols per frame.

The forward traffic channel symbols have a data bearing symbol power level set by the Traffic Channel Gain, $G_t$, and a power control information symbol power level set by the Power Control Subchannel Gain, $G_s$. Typically, $G_s$ is larger than $G_t$ for added assurance that the power control information is received by the remote unit. On a traffic channel, the Channel Data Rate, $r_t$, is described above and varies on a frame to frame basis in the preferred embodiment. In the preferred embodiment, the Power Control Subchannel Data Rate, $r_s$, is always full rate (i.e., is always equal to one) for the traffic channel. In the preferred embodiment, each the traffic channel frame is comprised of 24 symbols. Of that 24 symbols, two are power control symbols having a gain and rate as set by $G_s$ and $r_s$ respectively hence $s_{pc}$ is equal to 2. It follows that 22 out of every 24 symbols in a frame are data symbols having a gain and rate as set by $G_t$ and $r_t$ respectively hence $s_d$ is equal to 22. (In alternative embodiments using alternative formats, other numbers may be used.) Thus in calculating the expected power the ratio of the number of power control symbols to the total number of symbols within a frame and the ratio of the number of data symbols to the total number of symbols within a frame is used to scale the corresponding energy calculations.

The pilot channel data rate and gain are typically a fixed constant system wide. Thus Channel Gain, $G_t$, and the Channel Data Rate, $r_t$, are fixed constants for every frame. The sync and paging channels data rates are typically full rate at all times and the gain is also a system wide constant. For the pilot, paging, and sync channels the number of power control information symbols per frame, $s_{pc}$, is a zero.

The Channel Gain, $G_t$, and Power Control Subchannel Gain, $G_s$, are used to control the relative power used in each traffic channel transmitted by the base station in response to control information transmitted by each remote unit. The primary reason for providing such control is to accommodate the fact that in certain locations the forward channel link may be unusually disadvantaged as described above. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. The interference coming from the neighboring base stations does not fade in unison with the signal from the active base station as would be the case for interference coming from the active base station. A remote unit in such a situation may require 3 to 4 dB additional signal power from the active base station to achieve adequate performance. The adjustment would usually be small, typically on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

Each of the channels has a plurality of frames that can be sampled to created an average value based on a sample set of frames. Each channel element processor 36a–36i has first sampler 42 that samples every Mth frame of the plurality of frames communicated by the channel, the Traffic Channel Gain, $G_t$, the Power Control Subchannel Gain, $G_s$, the Traffic Channel Data Rate, $r_t$, and the Power Control Subchannel Data Rate, $r_s$. The sample rate of sampler 42 can be very low compared to the rate at which frames are sent. Note that Traffic Channel Gain, $G_t$, has a very slow time constant such as on the order of a second. The samples output by sampler 42 are subsequently averaged to obtain a controlling output. As such, the sampling process does not reduce the accuracy of the resulting average power as long as the samples are reflective of the total value. As such, sampler 42 must sample in an unbiased manner independent of any stimulus related to the transmit power. Accordingly, using Equation (1), calculator 43 calculates, to obtain a plurality of expected transmit power samples, $P_m$, according to Eq. 1.

The expected transmit power samples, $P_m$, is output from calculator 43 and input to $H_1$ filter 44. Preferably, $H_1$ filter 44 is a single pole infinite impulse response (IIR) filter for which a variety of constructions are well known in the art. The filter 44 filters (i.e. averages) the expected transmit powers according to the following equation:

$$\underline{P}_m = \psi_1 \underline{P}_{m-1} + (1-\psi_1) P_m, \qquad \text{Eq.2}$$

where:

$\psi_1$ represents a time constant;

$\underline{P}_{m-1}$ is the pervious state of the filter; and $\underline{P}_m$ is the output of the filter corresponding to $P_m$.

Each channel element processor 36a–36i also includes second sampler 45. The filtered expected power samples, $\underline{P}_m$, are sampled by second sampler 45 every N samples. Before being sent to BTSC 37, each of the N samples for the current state of the filter is sent through time stamp unit 46, which attaches a time stamp thereby specifying the time at which each sample is taken to produce the time stamped, filtered expected transmit power, $P_k$. The time stamps is used so that BTSC 37 may identify corresponding expected transmit powers from each different channel element processor 36a–36i.

The basic purpose of sampler 42, $H_1$ filter 44, and second sampler 45 is to reduce the amount of messaging from each channel element processor 36a–36i. Each channel element processor 36a–36i produces a certain number of messages that provide a variety of system information. If a expected power message was sent from every channel element processor 36a–36i for each frame in addition to the other system information messages, the messaging would overburden the system. To reduce the number of messages, each channel element processor 36a–36i performs a sampling and averaging function of the expected power by summing over a group of frames as set by the time constant $\psi_1$ of $H_1$ filter 44 and the sample rates of sampler 42 and second sampler 45. The filtered expected power information can be passed at a relatively slower rate (1/(N*M)) than once per frame.

Figure 5:
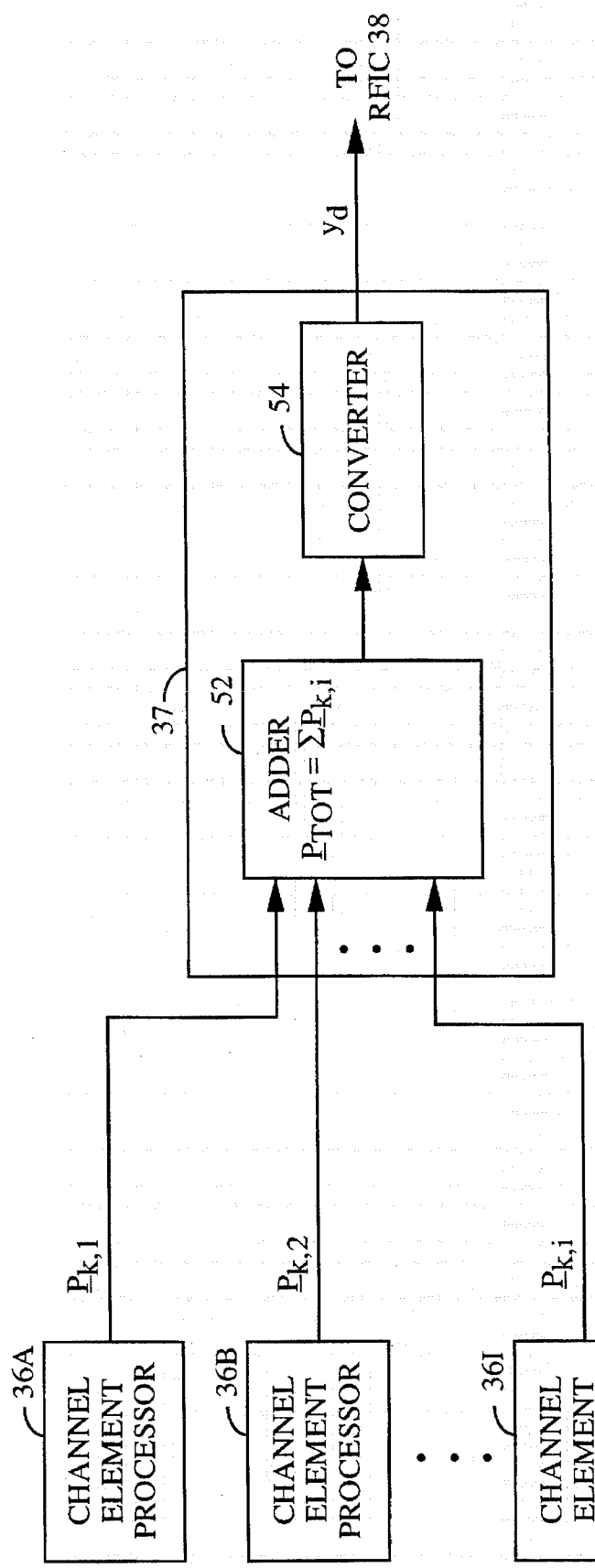
FIG. 5 is a block diagram illustrating summation of the channel elements of the base station by the base station transceiver system controller in the transmit chain of the base station of the present invention.

Referring now to FIG. 5, the BTSC 37 will be described. The BTSC 37 collects the corresponding expected transmit powers, $P_{k,i}$, from each channel element processor 36a–36i. Each channel element processor 36a–36i may correspond to the active channels in the system, including, for example, the pilot, paging, traffic, and sync channels or it may be idle in which case it contributes no power to the total. BTSC 37 includes adder 52, which sums the filtered expected power samples for each of the channel element processors, $P_{k,i}$ corresponding to the same time interval according to the time stamp attached by time stamp units 46 in each channel element processor 36a–36i.

BTSC 37 also includes converter 54, which receives the output from adder 52. Converter 54 converts the total expected transmit power from a bits squared value to a dB value which value is in dB-bits squared. Converter 54, however, is optional in BTSC 37 and thus need not be included. If included, converter 54 may comprise a lookup table stored in a read only memory (ROM) or other well known media. The resultant desired output power, $y_d$, is passed on to RFIC 38.

Figure 6:
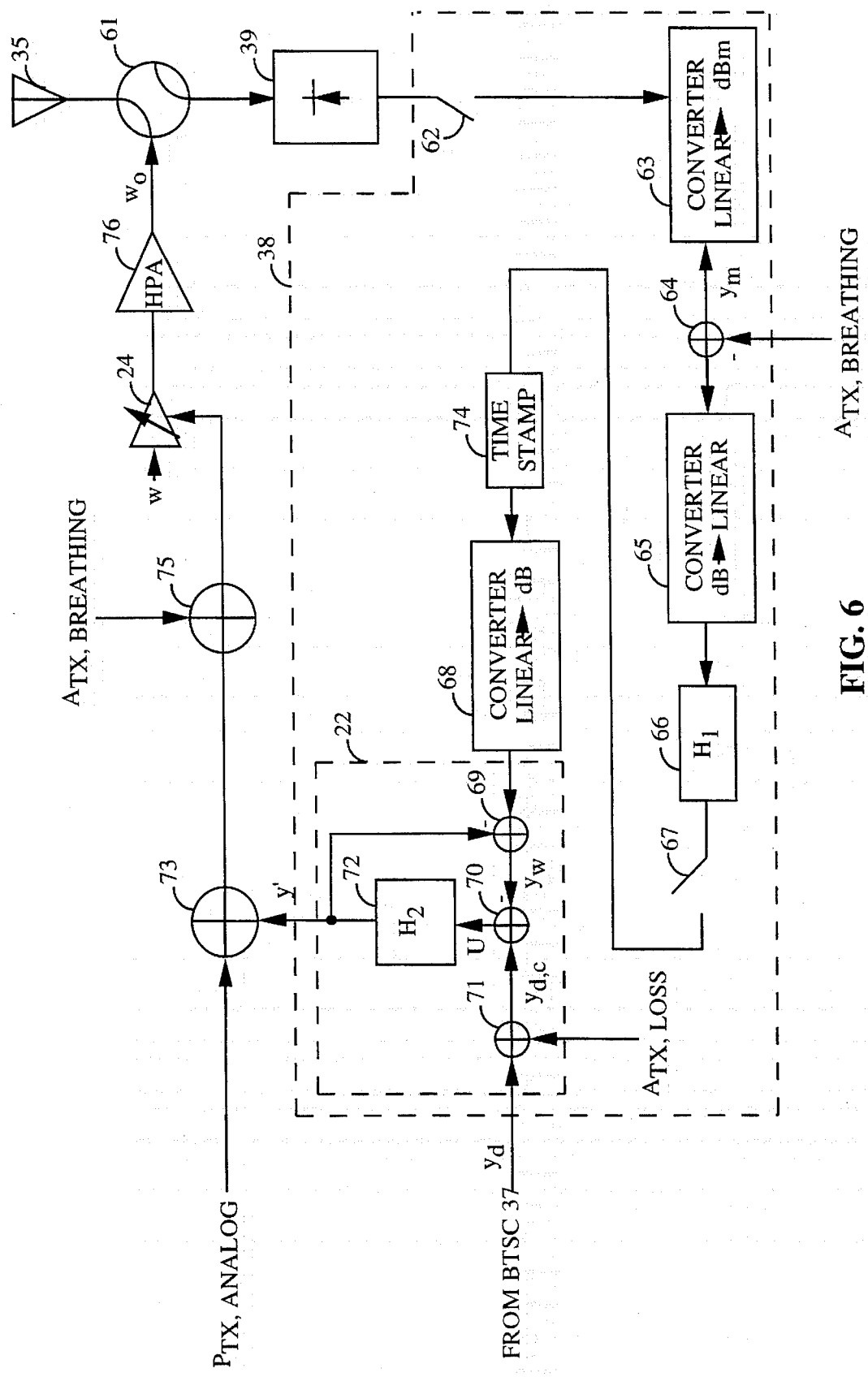
FIG. 6 is a block diagram of the radio frequency interface card in the transmit chain of the base station of the present invention.

FIG. 6 illustrates RFIC 38 and additional processing apparatus of the base station 30. RFIC 38 may comprise first RFIC sampler 62, first RFIC converter 63, first RFIC comparator 64, second RFIC converter 65, RFIC $H_1$ filter 66, second RFIC sampler 67, time stamp unit 74, third RFIC converter 68, and $H_3$ filter 22. Additional processing apparatus may process the transmit power tracking gain, y', output of the RFIC 38. The additional apparatus may include first output adder 73, second output adder 75, variable gain block 24, high power amplifier 76, and coupler 61.

As described above, transmit power detector 39 measures the power of the final output signal, $w_o$, being radiated by transmit antenna 35 of base station 30. First RFIC sampler 62 samples the voltage from transmit power detector 39 every Mth frame of the measured power. First RFIC converter 63 then converts the measured transmit power samples (analog voltage values) output by first RFIC sampler 62 to a dBm value, thereby obtaining a stream of converted transmit power samples, $y_m$. Preferably, first RFIC converter 63 comprises a lookup table.

The stream of converted transmit power samples, $y_m$, generated by first RFIC converter 63 is then input to first RFIC comparator 64. First RFIC comparator 64 subtracts a breathing attenuation value, $A_{TX, BREATHING}$, from the stream of converted transmit power samples, $y_m$ to obtain a stream of corrected transmit power samples. The breathing attenuation value is not accounted for in the expected power, because breathing information is unknown to channel element processors 36a–36i and therefore is not included in $y_d$. Therefore, to properly compare the actual transmit power, y, to the desired output power, $y_d$, the effect of breathing (with the appropriate time stamp) is removed by first RFIC comparator 64 before the comparison is made between $y_d$ and y within $H_3$ filter 22. The process of accounting for base station breathing will become more evident based on the description of the breathing algorithm described in detail below. Obviously, accounting for breathing in the RFIC 38 is not mandatory, but rather optional, because base station 30 may not be equipped for breathing. If base station 30 is not equipped for breathing, first RFIC comparator 64 may be omitted from RFIC 38.

After being processed by first RFIC comparator 64, the stream of corrected transmit power samples are input to second RFIC converter 65. Second RFIC converter 65 converts the corrected transmit power samples from a dB value to a linear unit value to obtain a plurality of linear corrected transmit power samples. In the preferred embodiment, second RFIC converter 65 comprises a lookup table.

The corrected transmit power samples are then input to RFIC $H_1$ filter 66. RFIC $H_1$ filter 66 is preferably the same filter used in channel element processor 36, i.e., $H_1$ filter 44. By filtering the stream of corrected transmit power samples according to Equation (2), the resultant y may be compared directly with $y_d$.

The filtered transmit power samples are then sampled again by second RFIC sampler 67. Second RFIC sampler 67 sends each Nth sample to third RFIC converter 68 in the same manner as the channel elements sample the expected power. As with each channel element processor 36a–36i, RFIC 38 includes time stamp unit 74 to attach a time stamp to each of the transmit power samples output by second RFIC sampler 67. In this way, the sampled transmit power samples output by third RFIC converter 68 can be coordinated timewise with samples output by BTSC 37. RFIC 38 includes third RFIC converter 68, which converts the output of time stamp unit 74 from linear gain units to units of dB which is passed as final transmit power, y, to $H_3$ filter 22.

Discrete time $H_3$ filter 22 includes second RFIC comparator 69, which subtracts the transmit power tracking gain, y', which is output by RFIC $H_2$ filter 72 from actual transmit power, y. The resultant output from second RFIC comparator 69 is an estimate, $y_w$. The estimate, $y_w$, is then input to third RFIC comparator 70, where estimate, $y_w$, is subtracted from the compensated desired output power, $y_{d,\ c}$. The resultant output from second RFIC comparator 70 is the control input, u.

The desired output power, $y_d$, from BTSC 37 is added via an adder 71 to a calibration constant, $A_{TX,\ LOSS}$. The calibration constant reflects the loss between the point where the power measurement is made (in this case, at the output of coupler 61) and antenna 35. $A_{TX,\ LOSS}$ varies from base station to base station and is determined at initial calibration of the base station.

In third RFIC comparator 70, where the estimate, $y_w$, is subtracted from the compensated desired output power, $y_{d,\ c}$, timing must have the appropriate precision. Time stamp unit 46 in channel element processor 36 and BTSC 37, respectively, together with time stamp unit 74 in RFIC 38, provide the means by which to accomplish this goal. Time stamp units 45 and 74 place the appropriate time stamp on each sample so that there is agreement between the samples output by BTSC 37 and second RFIC comparator 69. The measured and calculated power levels of base station 30 are time dependent, meaning those power levels are a function of the time at which the measurement is taken and the calculation is made. The time stamps facilitate alignment of the measured samples to the calculated power.

The output of third RFIC comparator 70, the control input, u, is then input to RFIC $H_2$ filter 72. Preferably, RFIC $H_2$ filter 72 comprises a single pole IIR filter. RFIC $H_2$ filter 72 filters the control input u to obtain the transmit power tracking gain, y', according to the following equation:

$$y'_t = \psi_2 y'_{t-1} + (1-\psi_2) u_t \qquad \text{Eq.3}$$

where:

$\psi_2$ represents a time constant;

$u_t$ is the control input corresponding to the current final transmit power, y, and desired output power, $y_d$ values;

$y'_t$ is output of the filter corresponding to $u_t$; and $y'_{t-1}$ is the pervious output of $H_2$ filter 72;

$\psi_2$ is a time constant. Using the transmit power tracking gain, y', the final output power of base station 30 can be obtained.

The additional processing apparatus in the base station transmit path processes the transmit power tracking gain, y', to generate the final output power. The additional apparatus includes first output adder 73, second output adder 75, variable gain block 24, high power amplifier (HPA) 76, and coupler 61.

The transmit power tracking gain, y', is output from RFIC $H_2$ filter 72 to first output adder 73, where it is added to a calibration value, $P_{TX,\ ANALOG}$, thereby yielding a corrected actual transmit power. A large base station may provide 10 Watts of output, while a small base station (such as one found within a building) may transmit only 1 Watt. Upon initial power-up of a base station, the output power level may be very far from the desired output power level. The transmit tracking loop time constant is slow and the transmit tracking loop may take a long period of time to track out the initial error. $P_{TX,\ ANALOG}$ can be a manual 'tweak' that can be used to pull the loop into the proper range quickly so that the transmit tracking loop can begin fine resolution tracking.

The corrected actual transmit power is then input to second output adder 75. Second output adder 75 adds back $A_{TX,\ BREATHING}$ to the corrected actual transmit power to obtain a breathing corrected actual transmit power. As stated above, however, if the base station 30 is not equipped with breathing apparatus, second output adder 75 may be omitted from base station 30.

The breathing corrected actual transmit power indication is then input to variable gain block 24, where it adjusts the power of the radio frequency transmit signal, w. The adjusted transmit power is input to high power amplifier (HPA) 76, where it is amplified to obtain the final transmitted signal, $w_o$. The final transmit power is then input to the coupler 61, which outputs the final output power to antenna 35 and a small portion of the final output power to transmit power detector 39. Transmit antenna 35, in turn, radiates the final transmit signal to the remote units that are communicating with base station 30.

In addition to the advantage noted above, note the effect of undesirable variations on the transmit chain. Such undesirable variations may come from temperature variations within the creating circuitry such that the level of the raw radio frequency transmit signal, w, is not stable. Also power amplifiers are subject to undesirable gain variations over temperature or aging or due to variation in the signal level input to the device. All of these variations, and any other extraneous undesirable gain variations are removed by this closed loop feedback mechanism.

With reference to FIGS. 7–10, the process and apparatus for base station breathing will now be described. As mentioned above, the path loss in a radio channel can be characterized by two separate phenomena: average path loss and fading. The forward link operates on a different frequency than the reverse link. Nevertheless, because the forward link and reverse link frequencies are within the same frequency band, a significant correlation exists between the average path loss of the two links. On the other hand, fading is an independent phenomenon for the forward link and the reverse link and varies as a function of time. The characteristics of the fading on the channel, however, are the same for both the forward and reverse links, because the frequencies are within the same band. Therefore, the average of fading over time of the channel for both links is typically the same.

In an exemplary CDMA system, each base station transmits a pilot signal having a common pseudo noise spreading code that is offset in code phase from the pilot signal of other base stations. During system operation, the remote unit is provided with a list of code phase offsets corresponding to neighboring base stations surrounding the base station through which communication is established. The remote unit is equipped with a searching element that allows the remote unit to track the signal strength (or power) of the pilot signal from a group of base stations that include neighboring base stations.

In a breathing cellular system, each base station in the system is initially calibrated such that the sum of the unloaded receiver noise level and the desired pilot power is equal to a calibration constant. The calibration constant is consistent throughout the system of base stations. As the system becomes loaded (i.e. remote units begin to communicate with the base stations), a compensation network maintains the constant relationship between the reverse link power received at the base station and the pilot power transmitted from the base station. Additional loading of a base station effectively moves the reverse link handoff boundary closer in toward the base station. Therefore, to imitate the same effect on the forward link, the transmit power is decreased as loading is increased.

Each base station has a physical coverage area in which communication with the base station is possible. Each base station coverage area has two handoff boundaries. A handoff boundary is defined as the physical location between two base stations where the link would perform in the same manner regardless of the base station with which a remote unit at that location was communicating. Each base station has a forward link handoff boundary and a reverse link handoff boundary. The forward link handoff boundary is defined as the location where the remote unit's receiver would perform the same regardless of which base station it was receiving. The reverse link handoff boundary is defined as the location of the remote unit where two base station receivers would perform the same with respect to that remote unit.

The preferred embodiment of the present invention is described based on reference to a system having soft handoff capability. The invention is equally applicable, however, to hard handoff operation.

Figure 7A:
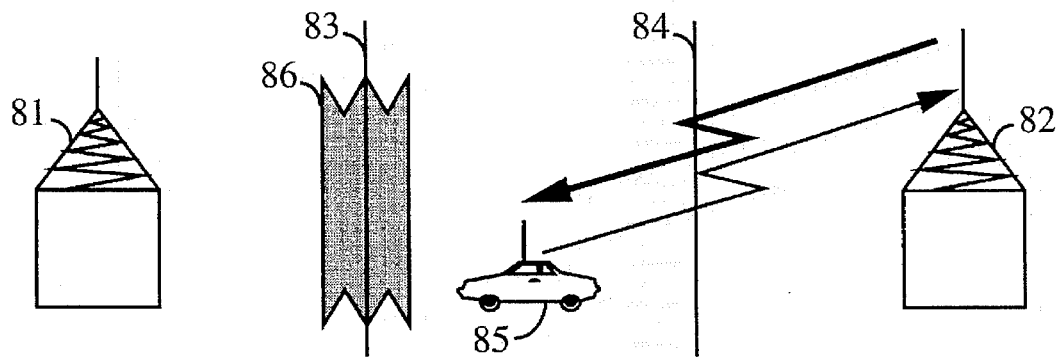
FIGS. 7A–7C illustrate three unbalanced handoff conditions.

Referring now to FIG. 7, a handoff boundary is always defined between at least two base stations. For example, in FIG. 7A, forward link handoff boundary 83 is a function of the power transmitted from base station 81 and from base station 82, as well as interference from other surrounding base stations (not shown) and other inband sources. Reverse link handoff boundary 84 is a function of the power level received at base station 81 and base station 82 from a remote unit 85 at that location and the power level received at base station 81 and base station 82 from the other remote units and other inband sources. Note that the power level received at base station 81 and the power level received at base station 82 are somewhat independent. That is, if base station 81 has a large number of remote units located within its coverage area and base station 82 has only one such remote unit, the interference for base station 82 is much less than that for base station 81.

Ideally, forward link handoff boundary 83 and reverse link handoff boundary 84 are co-located so that optimal system capacity may be achieved. If they are not co-located, three situations can occur that are detrimental to system capacity. FIG. 7A illustrates the first of these situations. A soft handoff region is the physical region between two base stations where a remote unit located within the region is likely to establish communication with both base stations. In FIG. 7A the shaded portion represents soft handoff region 86.

In remote unit assisted soft handoff, handoff region 86 is defined by the forward link characteristics. For example, in FIG. 7A, soft handoff region 86 represents the region in which the signal quality from both base station 81 and base station 82 are sufficient to support communications. When remote unit 85 enters soft handoff region 86, it notifies the base station with which it is communicating that the second base station is available for communication. A system controller (not shown) establishes communication between the second base station and remote unit 85. Further information on remote unit assisted soft handoff is described in U.S. Pat. No. 5,267,261, entitled "MOBILE STATION ASSISTED SOFT HANDOFF IN A CDMA CELLULAR COMMUNICATIONS SYSTEM" and assigned to the assignee of the present invention. When remote unit 85 is in the soft handoff region 86 between base station 81 and base station 82, both base stations 81, 82 control the transmit power from remote unit 85. Remote unit 85 decreases its transmit power if either base station 81 or base station 82 requests a decrease and increases its transmit power only if both base station 81 and 82 request an increase, as disclosed in U.S. Pat. No. 5,056, 109 mentioned above.

FIG. 7A illustrates the first situation that is detrimental to system capacity. In FIG. 7A, forward link handoff boundary 83 and reverse link handoff boundary 81 are significantly unbalanced (i.e., spaced apart). Remote unit 85 is located in a position where communication is established only with base station 82. In the region where the remote unit 85 is located, the forward link performance is best with base station 82, but the reverse link performance would be better if remote unit 85 were communicating with base station 81. In this situation, remote unit 85 is transmitting more power than it would be transmitting if it were communicating with base station 81. The increased transmit power adds unnecessarily to the total interference in the system, thereby adversely effecting capacity. It also increases the overall power consumption of remote unit 85, thereby decreasing its battery life. Finally, it endangers the communication link if remote unit 85 reaches its maximum transmit power and is unable to respond to commands for increased power from base station 82.

Figure 7B:
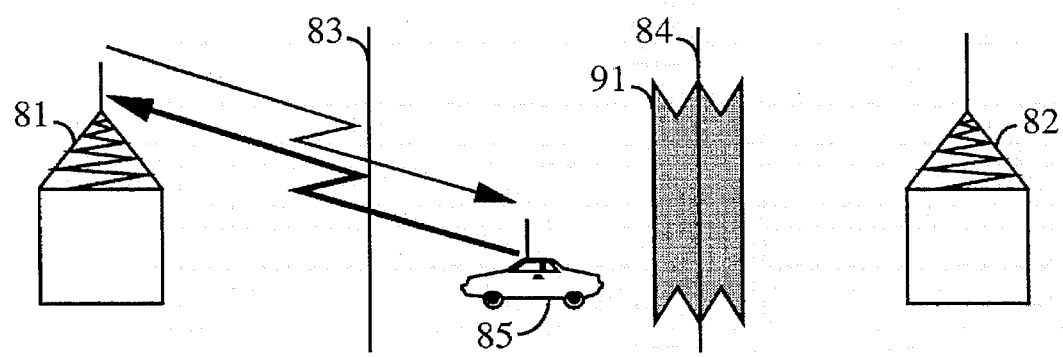

FIG. 7B shows an alternative but also detrimental result of an unbalanced handoff condition. In FIG. 7B, soft handoff region 91 is positioned about reverse link handoff boundary 84. This handoff position could be the result of an alternative handoff scheme, where handoff is based on the reverse link performance instead of the forward link performance. In one such case, each base station in the system attempts to measure the power received from each remote unit. When the measured power level exceeds a threshold or exceeds the level received at other base stations, communication with a second base station is established.

In FIG. 7B, remote unit 85 is located in a region where communication is established only with base station 81. As in FIG. 7A, in the region where the remote unit 85 is located, the forward link performance is best with base station 82, but the reverse link performance is best with base station 81. Unlike the reverse link, the forward link does not have a large dynamic range of transmit power, and as remote unit 85 moves toward base station 82, interference from base station 82 increases as the received power level from base station 81 decreases. If the power level from base station 81 fails below a sufficient signal to interference level or below a certain absolute level, the communication link is in danger of being of lost. The power level transmitted from base station 81 is slowly increased within a limited dynamic range as remote unit 85 moves away from base station 81. This power increase adversely interferes with other users of base station 81 and base station 82, thus unnecessarily decreasing system capacity.

Figure 7C:
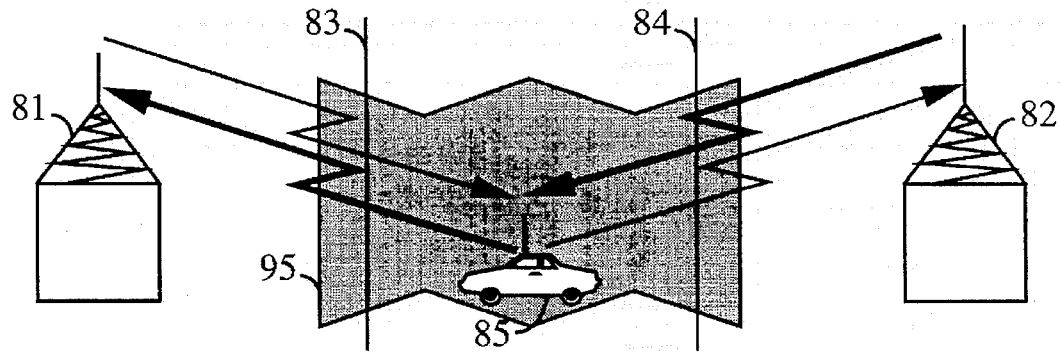

Yet another alternative that results in diminished system capacity involves a combined handoff scheme based on both the forward link performance and the reverse link performance. FIG. 7C shows one such scenario. In FIG. 7C, handoff region 95 is large and encompasses both reverse link handoff boundary 84 and forward link handoff boundary 83. But unnecessary soft handoff directly decreases the capacity of the system. The purpose of soft handoff is to provide a make before break handoff between base stations and to provide an efficient power control mechanism. If the soft handoff region is too large, however, the negative effects become significant. For example, in FIG. 7C, both base station 81 and base station 82 must transmit to remote unit 85 while remote unit 85 is in soft handoff region 95. As a consequence, the total system interference is increased while remote unit 85 is in soft handoff region 95. In addition, resources at both base station 81 and base station 82 must be dedicated to the signal received from remote unit 85. Therefore, increasing the size of the soft handoff region is not an efficient use of the system capacity and resources.

The solution to these adverse effects is to balance (i.e. physically align) reverse link handoff boundary 84 to forward link handoff boundary 83, or vice versa. Even if this were done at each base station in a static condition, the balance would be lost as the system was used. For example, the signal to interference level of the reverse link signal received at a base station is a function of the number, location, and transmission power level of the remote units within its coverage area. As the loading on one base station increases, interference increases and the reverse link handoff boundary shrinks toward the base station. The forward link boundary is not effected in the same manner, however. Thus, a system that is initially balanced may become unbalanced over time.

To maintain balance, an apparatus and method for "breathing" the size of the base station coverage area can be employed. The breathing apparatus effectively moves the forward link handoff boundary to the same location as the reverse link handoff boundary. Both of the boundaries are dependent on the performance of at least two base stations. For breathing to be effective, the reverse link handoff boundary and the forward link handoff boundary must be initially aligned. The boundaries can remain aligned if the performance of each base station is controlled as described below.

The forward link performance can be controlled by the base station. In an exemplary CDMA system, each base station transmits a pilot signal. The remote units perform handoff based on the perceived pilot signal strength. By changing the power level of the pilot signal transmitted from the base station, the forward link handoff boundary location may be manipulated.

The reverse link performance can also be controlled by the base station. The noise performance of the base station receiver sets the minimum receive power level that can be detected. The noise performance of the receiver is typically defined in terms of an overall system noise figure. By controlling the noise figure of the receiver, such as by injecting noise or adding attenuation, the reverse link performance, and hence the reverse link handoff boundary, may be adjusted.

To balance the handoff boundaries, the performance of each base station must be controlled to parallel the performance of other base stations in the system. Therefore, a system-wide performance constant is defined that is used by each base station in the system. A dynamic constant that is equal for every base station but allowed to change over time could also be defined. In the interest of simplicity of design and implementation, however, a fixed constant is preferred in this embodiment. Thus, rather than try to force all the base stations to be equal, the easiest method is to define a constant ratio and change the performance of every base station to match that ratio.

The constant is defined in terms of the sum of the receiver path noise in dB and the maximum desired pilot signal power in dB, as shown below. In the interest of system performance, the minimum increase in noise is desired. Also, in the interest of efficient use of base station resources, each base station should transmit the pilot signal at the maximum available level. Therefore, to define the constant, $K_{level}$, for each base station, the following equation is used:

$$K_{level} = MAX_{all\ i}\ [N_{Rx:i} + P_{Max:i}] \qquad \text{Eq. 4}$$

where:

$N_{Rx:i}$ is the receiver path noise of base station i in dB;

$P_{Max:i}$ is the maximum desired pilot signal power of base station i in dB; and $MAX_{all\ i}\ []$ finds the largest such sum of all base stations in a system.

Note that once $K_{level}$ is chosen, artificial means can be used to decrease the transmit power or increase the front-end noise of the base station.

To prove that setting the sum of the received power and the transmitted power to $K_{level}$ does indeed balance the system, several assumptions are made. The first is that in any base station using multiple redundant receive and transmit antennas, the antennas have been balanced to have the same performance. The second assumption is that identical decoding performance is available at each base station. The third assumption holds that a constant ratio exists between total forward link power and pilot signal power and that reciprocity exists in the forward link path loss and the reverse link path loss.

To find the forward link handoff boundary between two arbitrary base stations, base station A and base station B, start by noting that the forward handoff boundary occurs where the ratio of the pilot signal power of the two base stations to the total power is equal. Assume that mobile unit C is located at the boundary, mathematically in units of linear power (such as Watts):

$$\frac{\text{Pilot Power of } A \text{ Rx'd at } C}{\text{Total Power Received at } C} = \frac{\text{Pilot Power of } B \text{ Rx'd at } C}{\text{Total Power Received at } C} \qquad \text{Eq. 5}$$

Noting that the power received at the mobile unit is equal to the power transmitted times the path loss, Equation 5 becomes:

$$\frac{\text{Pilot Power Tx'd from } A \times \text{Path loss from } A \text{ to } C}{\text{Total Power Received at } C} = \qquad \text{Eq. 6}$$

$$\frac{\text{Pilot Power Tx'd from } B \times \text{Path loss from } B \text{ to } C}{\text{Total Power Received at } C}$$

Re-arranging Equation 6 and eliminating the common denominator, yields:

$$\frac{\text{Pilot Power Tx'd from } A}{\text{Pilot Power Tx'd from } B} = \frac{\text{Path loss from } B \text{ to } C}{\text{Path loss from } A \text{ to } C} \qquad \text{Eq. 7}$$

Following the same procedure for the reverse link and noting that the reverse link handoff boundary occurs where each base station perceives the same signal to interference ratio for that mobile unit:

$$\frac{\text{Power of } C \text{ Rx'd at } A}{\text{Total Power Received at } A} = \frac{\text{Power of } C \text{ Rx'd at } B}{\text{Total Power Received at } B} \qquad \text{Eq. 8}$$

Noting that the power received at the base station is equal to the power transmitted from the mobile unit times the path loss, Equation 8 becomes:

$$\frac{\text{Power Tx'd from } C \times \text{Path loss from } C \text{ to } A}{\text{Total Power Received at } A} = \qquad \text{Eq. 9}$$

$$\frac{\text{Power Tx'd from } C \times \text{Path loss from } C \text{ to } B}{\text{Total Power Received at } B}$$

Re-arranging Equation 9 and eliminating the common numerator, yields:

$$\frac{\text{Total Power Received at } A}{\text{Total Power Received at } B} = \frac{\text{Path loss from } C \text{ to } A}{\text{Path loss from } C \text{ to } B} \quad \text{Eq. 10}$$

Due to the assumed reciprocity in the forward and reverse link path loss at any location, Equations 7 and 10 may be combined to yield:

$$\frac{\text{Total Power Received at } A}{\text{Total Power Received at } B} = \frac{\text{Pilot Power Tx'd from } B}{\text{Pilot Power Tx'd from } A} \quad \text{Eq. 11}$$

Changing the units of Equation 11 from linear power to dB yields:

Total Power Received at $A$(dB) −

Total Power Received at $B$(dB) =

Pilot Power Tx'd from $B$(dB) − Pilot Power Tx'd from $A$(dB)

Eq. 11'

Equation 11' is equivalent to premise set forth in that:

if Total Power Received at A (dB)+Pilot Power Tx'd from A (dB)=$K_{level}$ and Total Power Received at B (dB)+Pilot Power Tx'd from B (dB)=$K_{level}$ then equation 11' will be satisfied.

And the forward link handoff boundary and the reverse link handoff boundary are co-located.

Three mechanisms are needed to perform the breathing function: means for initially setting performance to $K_{level}$, means for monitoring the fluctuations in the reverse link, and means for changing the performance of the forward link in response to the reverse link fluctuations.

One method of initially setting the performance to $K_{level}$ is to set the maximum desired pilot signal strength taking into account the variations over temperature and time and adding attenuation in line with the receiver in a no input signal condition until the $K_{level}$ performance is achieved. Adding attenuation desensitizes the receiver and effectively increases the noise figure thereof. This also requires that each mobile unit transmit proportionately more power. The added attenuation should be kept to the minimum dictated by $K_{level}$.

Once initial balance is achieved, the power coming into the base station can be measured to monitor the reverse link performance. Several methods can be used. Measurement can be done by monitoring an AGC (automatic gain control) voltage or by directly measuring the incoming level. This method has the advantage that if an interferer is present (such as an FM signal) the interference energy is measured and the handoff boundaries will be drawn closer to the base station. By drawing the handoff boundary closer to the base station, the interferer may be eliminated from the coverage area of the base station and its effect minimized. Measurement could be made by simply counting the number of users communicating through the base station and estimating the total power based on the fact that each mobile unit's signal nominally arrives at the base station at the same signal level.

As the reverse link power increases, the forward link power should be decreased. The decrease in power must be achieved without disturbing the transmit tracking loop performance.

In an exemplary handoff scheme, handoff boundaries are based on measurement of the pilot signal strength at the remote unit. An alternative to controlling the total transmit power would be to control only the pilot signal level. To the coverage area designer this scheme might have a certain sense of appeal, but controlling the total transmit power, including the traffic, sync, paging, and pilot signals, has some advantages. First, the ratio of the pilot signal to the traffic channel signal remains fixed. The remote unit is expecting the ratio to be fixed and bases the allocation of its resources on the ratio. If the remote unit were to receive two equally powerful pilot signals, each corresponding to a traffic channel having a different power level, the demodulation of the two signals in the soft handoff process is corrupted. Second, controlling the total transmit power reduces the interference with other base station coverage areas. If the pilot signal is not strong enough to warrant a handoff in the coverage area of a neighboring base station, the high powered traffic channel signal adds unusable and unnecessary interference to that area.

In an ideal configuration, the breathing mechanism would measure the receive power and change the transmit power proportionately. Nonetheless, some systems may not use the proportional method and may instead change the transmit level only a fraction of the perceived change in receive power. For example, if a system were designed in which the estimation of the received power was difficult and inaccurate, the system designers may wish to decrease the sensitivity to the inaccuracy. A change in transmit power level that is only a fraction of the change in receive power achieves the desensitization, while preventing a gross imbalance in the handoff boundaries.

Another alternative changes the transmit level only when the receive level exceeds a predetermined threshold. This method could be used primarily to deal with interferers. Of course, this method may be combined with a system that changes the transmit power level only a fraction of the perceived change in receive power.

The breathing mechanism must have a carefully considered time constant. The breathing mechanism may cause remote unit handoff. To perform a handoff, the remote unit must detect the change in power and send a message to the base station. The system controller must make a decision and notify base stations. A message must be sent back to the remote unit. This process takes time and the breathing process should be slow enough to allow this process to happen smoothly.

The rate at which cell breathing is performed is governed by the rate at which a soft handoff can be accomplished. In present systems, the fastest a soft handoff can be accomplished is approximately 1/10 of a second. According to this time, to assure that a soft handoff occurs without disconnecting or interrupting the call in progress, the transmit gain is adjusted at a rate of 1 to 2 dB/second. Preferably, however, to provide a margin for error in soft handoff, the transmit gain is adjusted at a lower rate, namely, less than 1 dB/second.

The process of breathing will naturally limit itself to prevent the total convergence of the coverage area of the base station due to excess users on the system. The CDMA system has a large and soft-limited capacity. The term soft-limited capacity refers to the fact that one more user can always be added, but at some number of users, each additional user effects the communication quality of all the other users. At some greater number of users, each user's communication quality becomes unusable and the entire link is lost to every remote unit. To prevent the loss of the link, each base station limits the number of remote units with which it will establish communication. Once that limit has been reached, the system refuses attempts to establish additional calls; i.e. new call originations are blocked. The limit is a design parameter and is typically set at about 75% of theoretical capacity. This gives some margin to the system and allows the system to accept an emergency call even while in the limited condition. This limit of the total number of remote units communicating within the coverage area of a single base station naturally limits the maximum received power and therefore limits the breathing process range of operation.

Figure 8A:
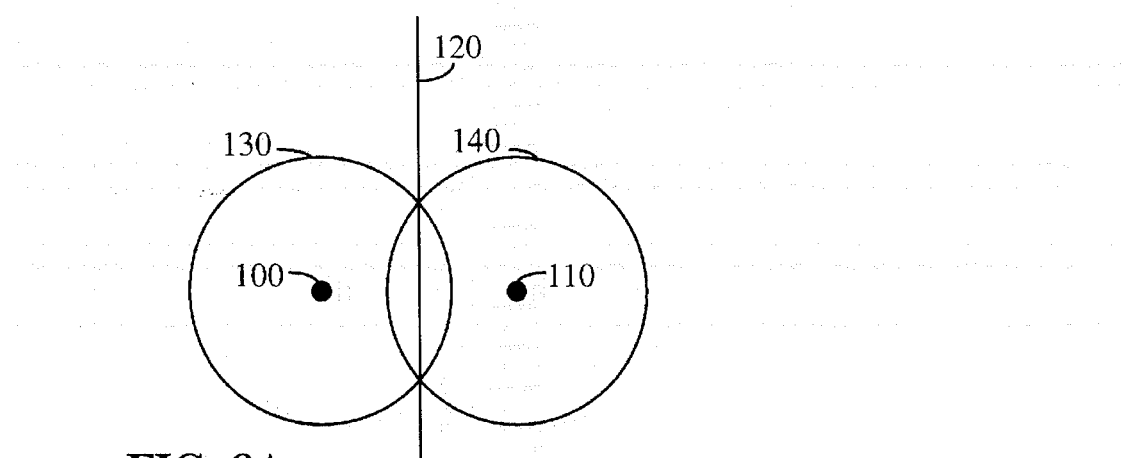
FIGS. 8A–8C illustrate the effect of loading on the handoff boundaries and the effect of the breathing mechanism compensation.
Figure 8B:
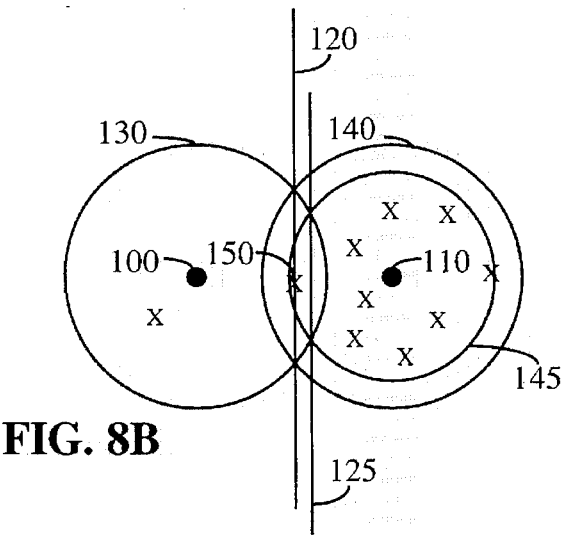
Figure 8C:
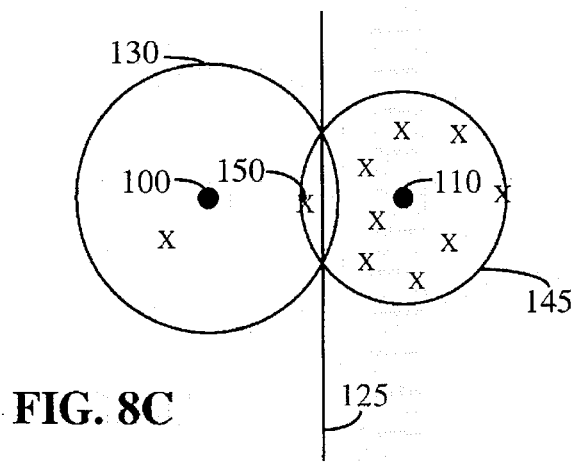

FIGS. 8A–8C illustrate the base station breathing process. In FIG. 8A, base station 100 has circular coverage area 130 in an unloaded condition. The coverage area of base station 100 has been balanced in an unloaded condition, and the forward and reverse link coverage areas are aligned with circular coverage area 130. Base station 110 has circular coverage area 140 in an unloaded condition. The coverage area of base station 110 has also been balanced in an unloaded condition, and the forward and reverse link coverage areas are aligned with circular coverage area 140. The operation of base stations 100 and 110 have been balanced to $K_{level}$ in an unloaded condition and line 120 represents the location at which operation with each base station is the same and hence represents both handoff boundaries.

In FIG. 8B, base station 110 has become heavily loaded, and base station 100 is lightly loaded. The coverage area of the reverse link has shrunk to the location of circular coverage area 145 while the forward link coverage area remains at circular coverage area 140. The light loading of base station 100 has not effected the coverage area of base station 100, which is still at circular coverage area 130. Note that the reverse link handoff boundary between base station 100 and base station 110 has moved to line 125, while the forward link handoff boundary remains at line 120. Thus, the undesirable, unbalanced handoff boundary condition has arisen.

In FIG. 8C, base station 110 has implemented the base station breathing mechanism. This causes the forward link handoff boundary to move to circular coverage area 145. Line 125 now represents both the forward and reverse link handoff boundaries.

In FIGS. 8B and 8C, each "X" represents a remote unit. In particular, remote unit 150 is located at the handoff boundary in FIG. 8B. Due to its location, remote unit 150 is in the soft handoff region between base station 100 and base station 110. Note that in FIG. 8C, remote unit 150 is now well into the coverage area of base station 100 and not in the soft handoff region between base station 100 and base station 110. Therefore, the heavily loaded base station 110 has effectively transferred some of its load to the lightly loaded base station 100.

Those skilled in the art will recognize that the present invention can be used for a variety of different base stations. As discussed above, in cellular communications systems, base stations may be single- or multi-sectored. The coverage area of a single-sectored base station comprises a basically circular configuration, as illustrated in FIGS. 8A–8C. Multi-sectored base stations can also be used. For example, a base station may be three-sectored, each sector providing approximately ⅓ of the coverage area of the base station, depending on loading of the base station.

Figure 9:
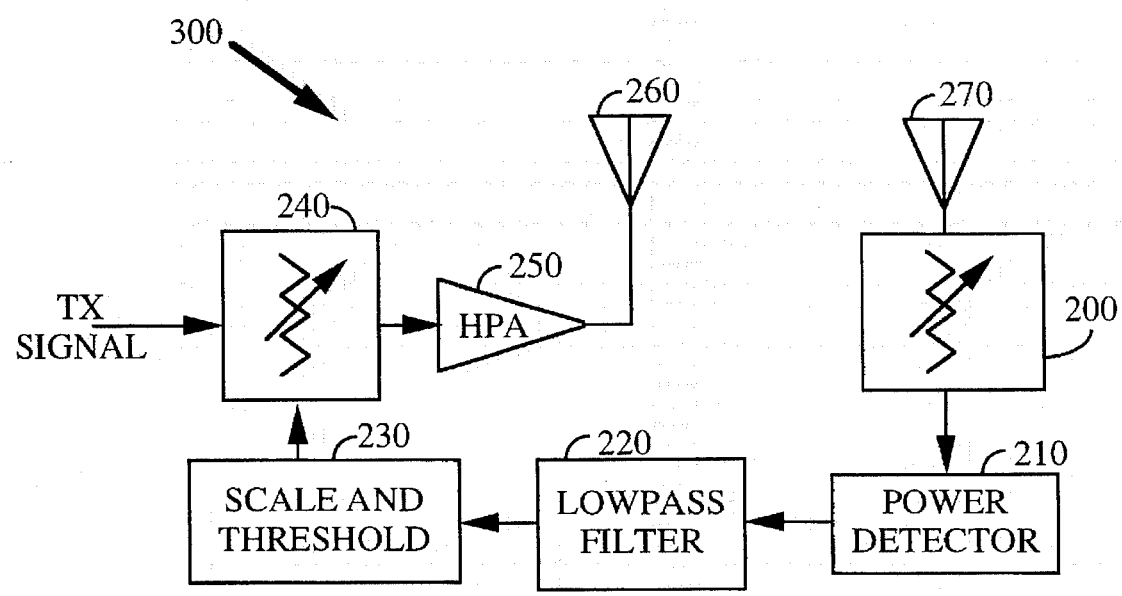
FIG. 9 is highly simplified block diagram of the breathing mechanism in a base station.

FIG. 9 is a block diagram illustrating an exemplary configuration of the base station breathing apparatus. Receive antenna 270 collects (or receives) signals at base station 300. The received signals are then passed to variable attenuator 200, which has been used to initially set $K_{level}$ operation. From variable attenuator 200, the received signals are passed to power detector 210. Power detector 210 generates a signal indicating the total power level in the received signal. Low pass filter 220 averages the power indication and slows the breathing response time. Scale and threshold unit 230 sets the desired ratio and offset of the relation between increases in the reverse link power and decreases in the forward link power. Scale and threshold unit 230 then outputs a control signal to variable gain device 240. Variable gain device 240 may be a controllable attenuator similar to variable attenuator 200 or it may be a variable gain amplifier. Variable gain device 240 accepts the transmit signal and provides a gain controlled output signal to HPA 250. HPA 250 amplifies the transmit signal and passes it to transmit antenna 260 for transmission over the wireless link.

Many variations exist in the configuration of the breathing apparatus illustrated in FIG. 9. For example, transmit antenna 260 and receive antenna 270 may each comprise two antennas. Conversely, antennas 260 and 270 may be the same antenna. Power detected by power detector 210 is based on all incoming signal power within the band of interest. As discussed above, power detection can be based solely on the number of remote units that have established communication with base station 300. Also, low pass filter 220 may be a linear filter or nonlinear filter (such as a slew rate limiting filter). Additional information on base station breathing is described in U.S. patent application Ser. No. 08/278,347, entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM", filed Jul. 21, 1994, and assigned to the assignee of the present invention.

Figure 10:
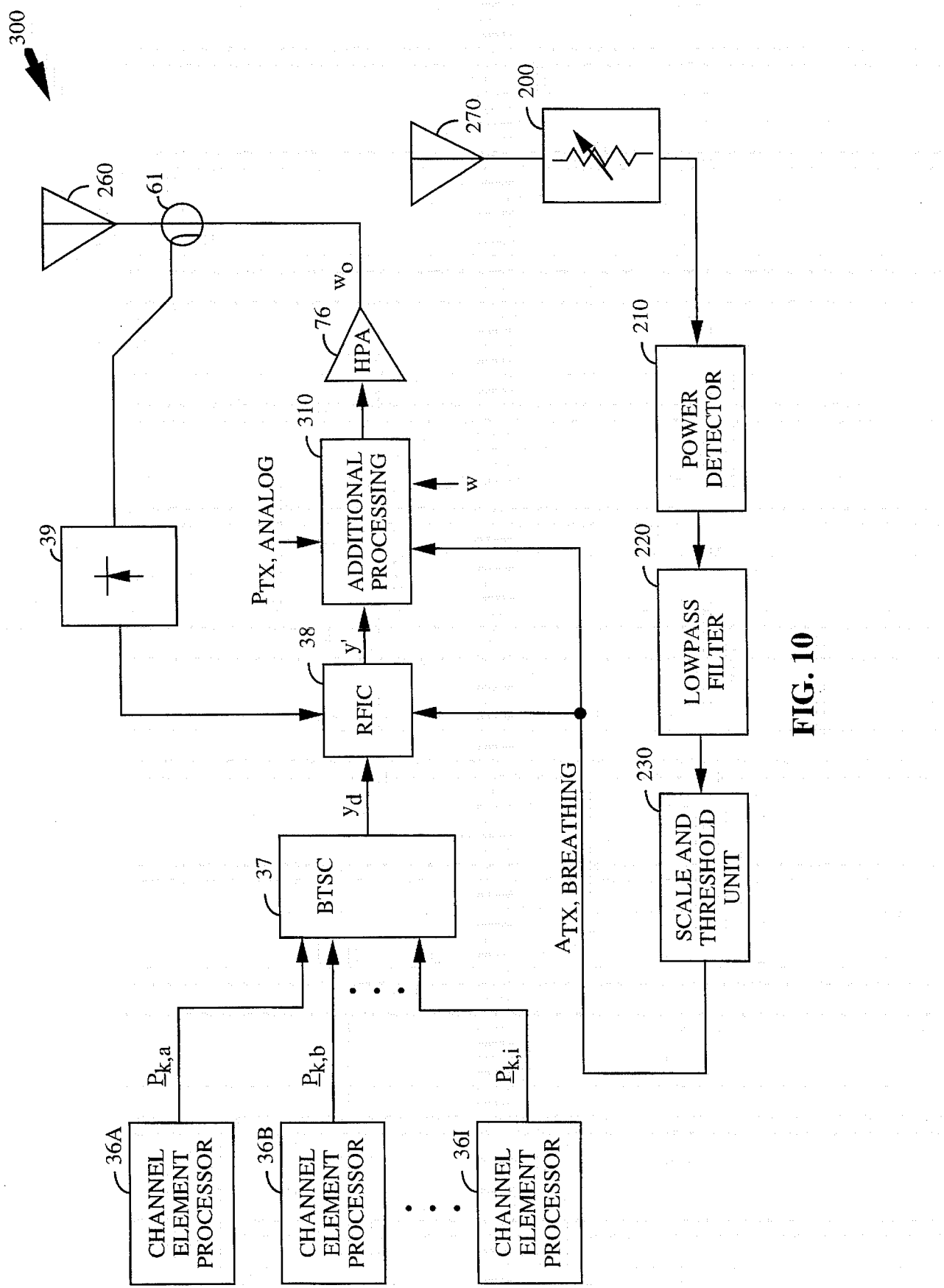
FIG. 10 is a block diagram of the base station transmit power tracking loop apparatus of the present invention together with the breathing mechanism.

FIG. 10 illustrates a simplified apparatus that incorporates cell breathing and transmit power control according to the present invention. This apparatus makes the transmit power level responsive to fluctuations in the power level of the signal received by base station 300. The natural receive signal, which is collected by receive antenna 270, is input to variable attenuator 200. Variable attenuator 200 varies the level of artificial noise receive power and outputs the altered receive power of the base station 300. Artificial noise receive power refers to noise that is injected into the receive signal by variable attenuator 200. As in the apparatus of FIG. 9, the receive path also includes power detector 210, which generates a power level output signal indicating the total power in the altered signal. Lowpass filter 220 averages the altered power level output signal. Finally, scale and threshold unit 230 sets the desired ratio and offset of the relation between increases in the receive power and decreases in transmit power and outputs the breathing attenuation value, $A_{TX, BREATHING}$.

As described above, channel element processors 36a–36i, BTSC 37, and RFIC 38 are used to produce the final output signal, $w_o$, of base station 300. In the apparatus of FIG. 10, the breathing attenuation value $A_{TX, BREATHING}$ is input to RFIC 38 and to additional processor 310, which may comprise first output adder 73, second output adder 75, and variable gain block 24. As described above, the gain and data rate for each channel are input to each channel element processor 36a–36i, which output the filtered expected powers, $P_{k,a}$–$P_{k,i}$, to BTSC 37. BTSC 37 sums the filtered expected power, $P_{k,a}$–$P_{k,i}$, and generates and outputs desired output power, $y_d$, to RFIC 38. RFIC 38 processes $y_d$, together with the measured transmit power level as measured by transmit power detector 39 and $A_{TX, BREATHING}$, to obtain y'.

In turn, y' is input to additional processor 310, which outputs the signal that is amplified by HPA 76 to generate the final output signal, $w_o$. The final output signal, $w_o$, is then radiated to the remote units by transmit antenna 260. Due to the feedback configuration using $A_{TX, BREATHING}$, based on the receive link power, the final output power of final output signal, $w_o$, is balanced with the receive power. This balance of power, in turn, causes the forward and reverse link coverage areas of the base station 300 to be balanced as well.

It will be apparent to those skilled in the art that various modifications and variations can be made in the apparatus and method of the present invention without departing form the spirit or scope of the invention. Thus, it is intended that the present invention cover the modifications and variations of this invention, provided they come within the scope of the appended claims and their equivalents.

We claim:

1. An apparatus for controlling a power of a final output signal, $w_o$, of a base station in a cellular communications system, said base station providing communication on a plurality of channels, said base station having a transmit power tracking gain, y', and a radio frequency transmit signal, w, said apparatus comprising:

a plurality of channel elements for calculating a plurality of expected powers, each of said plurality of expected powers corresponding to one of said plurality of channels;

a base station transceiver system controller (BTSC) for generating a desired output power, $y_d$, of said base station, said BTSC based on said plurality of expected powers;

a transmit power detector for measuring a final transmit power of said final output signal, $w_o$;

a radio frequency interface card (RFIC) for generating said transmit power tracking gain, y', by processing said final transmit power and said desired output power, $y_d$, to obtain a control input, u, said RFIC comprising a transmit filter for filtering said control input, u, to obtain said transmit power tracking gain, y'; and a gain unit for processing said transmit power tracking gain, y', generated by said RFIC and said radio frequency transmit signal, w, to obtain said final output signal, $w_o$.

2. The apparatus recited in claim 1 wherein said final output signal, $w_o$, is comprised of plurality of signals generated by said plurality of channel elements, wherein at least one of said plurality of signals is comprised of a series of frames, each frame of which is comprised of a number of data symbols, $s_d$, and a number of power control symbols, $s_{pc}$, wherein at least one of said plurality of channels has a traffic channel gain, $G_t$, a power control subchannel gain, $G_s$, a traffic channel data rate, $r_t$, and a power control sub channel data rate, $r_s$, and wherein for each of said plurality of channel elements generating a traffic channel signal said expected power, P, is calculated by the equation:

$$P = s_d(G_t^2 \times r_t)/(s_d + s_{pc}) + s_{pc}(G_s^2 \times r_s)/(s_d + s_{pc}).$$

3. The apparatus recited in claim 2 wherein each of said plurality of channel elements generating a traffic channel signal further comprises a first sampler for sampling from every Mth frame of said series of data frames for said corresponding traffic channel gain, $G_t$, said corresponding power control subchannel gain, $G_s$, said corresponding traffic channel data rate, $r_t$, and said corresponding power control subchannel data rate, $r_s$, to obtain a plurality of expected power samples, $P_m$.

4. The apparatus recited in claim 3 wherein each of said plurality of channel elements further comprises a filter for filtering said plurality of expected power samples, $P_m$, to obtain a plurality of filtered expected power samples, $\underline{P}_m$, according to the following equation:

$$\underline{P}_m = \psi_1 \underline{P}_{m-1} + (1-\psi_1) P_m,$$

where:

$\psi_1$ represents a time constant;

$\underline{P}_{m-1}$ is the previous state of said filter; and $\underline{P}_m$ is the output of said filter corresponding to $P_m$.

5. The apparatus recited in claim 4 wherein each of the plurality of channel elements further comprises a second sampler and a time stamp unit for sampling each Nth sample of said output of said filter, $\underline{P}_m$, to produce a series of sampled filtered expected powers, $P_k$, and attaching to each of said series of sampled filtered expected powers a time stamp indication.

6. The apparatus recited in claim 5 wherein said BTSC comprises an adder for summing a plurality of said series of sampled filtered expected powers, $P_k$, each corresponding to a different one of said plurality of channel elements and each corresponding to a common time stamp indication to obtain said desired output power, $y_d$.

7. The apparatus recited in claim 2 wherein said RFIC comprises a first sampler for sampling said measured transmit power during every Mth frame to obtain a series of sampled measured values, $y_m$.

8. The apparatus recited in claim 7 wherein said RFIC further comprises a first adder for subtracting a breathing attenuation value, $A_{TX, BREATHING}$, from each of said series of sampled measured values, $y_m$.

9. The apparatus recited in claim 7 wherein said RFIC further comprises a filter for filtering said series of sampled measured values, $y_m$, to obtain a series of filtered power samples, $\underline{y}_m$, according to the following equation:

$$\underline{y}_m = \psi_1 \underline{y}_{m-1} + (1-\psi_1) y_m,$$

where:

$\psi_1$ represents a time constant;

$\underline{y}_{m-1}$ is the previous state of said filter; and $\underline{y}_m$ is the output of said filter corresponding to $y_m$.

10. The apparatus recited in claim 9 wherein said RFIC further comprises a second sampler and a time stamp unit for sampling each Nth sample of said series of filtered power samples, $\underline{y}_m$, to produce a series of sampled filtered expected powers, $y_k$, and attaching to each of said series of sampled filtered expected powers a time stamp indication.

11. The apparatus recited in claim 10 wherein said RFIC further comprises a third comparator for subtracting the transmit power tracking gain, y', from said series of sampled filtered expected powers, $y_k$.

12. The apparatus recited in claim 11 wherein each of said plurality of channel elements generating a traffic channel signal further comprises a first sampler for sampling from every Mth frame of said series of data frames for said corresponding traffic channel gain, $G_t$, said corresponding power control subchannel gain, $G_s$, said corresponding traffic channel data rate, $r_t$, and said corresponding power control subchannel data rate, $r_s$, to obtain a plurality of expected power samples, $P_m$.

13. The apparatus recited in claim 12 wherein each of said plurality of channel elements further comprises a filter for filtering said plurality of expected power samples, $P_m$, to obtain a plurality of filtered expected power samples, $\underline{P}_m$, according to the following equation:

$$\underline{P}_m = \psi_1 \underline{P}_{m-1} + (1-\psi_1) P_m,$$

where:

$\psi_1$ represents a time constant;

$\underline{P}_{m-1}$ is the previous state of said filter; and $\underline{P}_m$ is the output of said filter corresponding to $P_m$.

14. The apparatus recited in claim 13 wherein each of the plurality of channel elements further comprises a second sampler and a time stamp unit for sampling each Nth sample of said output of said filter, $\underline{P}_m$, to produce a series of sampled filtered expected powers, $P_k$, and attaching to each of said series of sampled filtered expected powers a time stamp indication.

15. The apparatus recited in claim 14 wherein said BTSC comprises an adder for summing a plurality of said series of sampled filtered expected powers, $P_k$, each corresponding to a different one of said plurality of channel elements and each corresponding to a common time stamp indication to obtain said desire output power, $y_d$.

16. The apparatus recited in claim 15 wherein said RFIC further comprises a calibration adder for adding a calibration constant, $A_{TX,\ LOSS}$, to said desired output power, $y_d$, wherein said calibration constant, $A_{TX,\ LOSS}$ is indicative of a loss between a point where said transmit power detector measures said final transit power and an antenna for transmitting said final output signal, $w_o$.

17. The apparatus recited in claim 16 wherein said gain unit comprises a variable gain block having a gain responsive to said transmit power tracking gain, $y'$, and receiving said radio frequency transmit signal, $w$.

18. The apparatus recited in claim I wherein the gain unit comprises:

a second adder for adding a transmit power ability factor, $P_{TX,\ ANALOG}$, indicating the maximum transmit power capability of said base station and the transmit power tracking gain, $y'$ to obtain a corrected transmit power tracking gain;

a third adder for adding said corrected transmit power gain and a breathing attenuation value, $A_{TX,\ BREATHING}$, to obtain a breathing corrected transmit power gain;

a variable gain block having a gain responsive to said breathing corrected transmit power gain for receiving said radio frequency transmit signal, $w$, and providing an amplitude controlled signal; and a high power amplifier for amplifying said amplitude controlled signal and producing said final output signal, $w_o$.

19. A method for controlling a power of a final output signal, $w_o$, of a base station in a cellular communication system, said base station providing communication on a plurality of channels, said base station having a transmit power tracking gain, $y'$, said method comprising the steps of:

calculating a plurality of expected powers, each of said plurality of expected powers corresponding to one of said plurality of channels;

summing said plurality of expected powers to generate a desired output power, $y_d$, of said base station;

measuring said power of said final output signal, $w_o$, to obtain a measured transmit power;

comparing said desired output power, $y_d$, and said measured transmit power to obtain a control input, $u$;

filtering said control input, $u$, to obtain said transmit power tracking gain, $y'$; and adjusting the power of said final output signal, $w_o$, according to said transmit power tracking gain, $y'$.

20. The method recited in claim 19 wherein said final output signal, $w_o$, is comprised of a plurality of signals, wherein at least one of said plurality of signals is comprised of a series of frames, each frame of which is comprised of a number of data symbols, $s_d$, and a number of power control symbols, $s_{pc}$, wherein at least one of said plurality of channels has a traffic gain, $G_t$, a power control subchannel gain, $G_s$, a traffic data rate, $r_t$, and a power control subchannel data rate, $r_s$, and wherein for each of said plurality of channels corresponding to a traffic channel signal said expected power, P, is calculated by the equation:

$$P=s_d(G_t^2 \times r_t)/(s_d+s_{pc})+s_{pc}(G_s^2 \times r_s)/(s_d+s_{pc}).$$

21. The method recited in claim 20 further comprising the step of sampling from every Mth frame of said series of data frames for said corresponding traffic channel gain, $G_t$, said corresponding power control sub channel gain, $G_s$, said corresponding traffic channel data rate, $r_t$, and said corresponding power control subchannel data rate, $r_s$, and calculating a corresponding plurality of expected power samples, $P_m$.

22. The method recited in claim 21 further comprises the step of filtering said plurality of expected power samples, $P_m$, to obtain a plurality of filtered expected power samples, $\underline{P}_m$, according to the following equation:

$$\underline{P}_m = \psi_1 \underline{P}_{m-1} + (1-\psi_1) P_m,$$

where:

$\psi_1$ represents a time constant;

$\underline{P}_{m-1}$ is the previous result of said step of filtering; and $\underline{P}_m$ is the result of said step of filtering corresponding to $P_m$.

23. The method recited in claim 22 further comprising the steps of:

sampling each Nth one of said plurality of filtered expected power samples, $\underline{P}_m$, to produce a series of sampled filtered expected powers, $P_k$; and attaching to each of said series of sampled filtered expected powers, $P_k$, a time stamp indication.

24. The method recited in claim 23 further comprising the steps of summing a plurality of said series of sampled filtered expected powers, $P_k$, each corresponding to a different one of said traffic channel signals and each corresponding to a common time stamp indication to obtain said desired output power, $y_d$.

25. The method recited in claim 20 further comprising the step of sampling said measured transmit power during every Mth frame to obtain a series of sampled measured values, $y_m$.

26. The method recited in claim 25 further comprising the step of subtracting a breathing attenuation value, $A_{TX,\ BREATHING}$, from each of said series of sampled measured values, $y_m$.

27. The method recited in claim 25 wherein said RFIC further comprising the step of filtering said series of sampled measured values, $y_m$ to obtain a series of filtered power samples, $\underline{y}_m$, according to the following equation:

$$\underline{y}_m = \psi_1 \underline{y}_{m-1} + (1-\psi_1) y_m,$$

where:

$\psi_1$ represents a time constant;

$\underline{y}_{m-1}$ is the previous state of said filter; and $\underline{y}_m$ is the output of said filter corresponding to $y_m$.

28. The method recited in claim 27 further comprising the step of:

sampling each Nth output of said series of filtered power samples, $\underline{y}_m$, to produce a series of sampled filtered expected bowers, $y_k$; and attaching to each of said series of sampled filtered expected powers a time stamp indication.

29. The method recited in claim 28 further comprising the step of subtracting the transmit power tracking gain, y', from said series of sampled filtered expected powers, $y_k$.

30. The method recited in claim 29 further comprising the step of sampling from every Mth frame of said series of data frames for said corresponding traffic channel gain, $G_t$, said corresponding power control subchannel gain, $G_s$, said corresponding traffic channel data rate, $r_t$, and said corresponding power control subchannel data rate, $r_s$, and calculating a corresponding plurality of expected power samples, $P_m$.

31. The method recited in claim 30 further comprises the step of filtering said plurality of expected power samples, $P_m$, to obtain a plurality of filtered expected power samples, $\underline{P}_m$, according to the following equation:

$$\underline{P}_m = \psi_1 \underline{P}_{m-1} + (1-\psi_1) P_m,$$

where:

$\psi_1$ represents a time constant;

$\underline{P}_{m-1}$ is the previous result of said step of filtering; and $\underline{P}_m$ is the result of said step of filtering corresponding to $P_m$.

32. The method recited in claim 31 further comprising the steps of:

sampling each Nth one of said plurality of filtered expected power samples, $\underline{P}_m$, to produce a series of sampled filtered expected powers, $P_k$; and attaching to each of said series of sampled filtered expected powers, $P_k$, a time stamp indication.

33. The method recited in claim 32 further comprising the steps of summing a plurality of said series of sampled filtered expected powers, $P_k$, each corresponding to a different one of said traffic channel signals and each corresponding to a common time stamp indication to obtain said desired output power, $y_d$.

34. The method recited in claim 33 further comprising the step of adding a calibration constant, $A_{TX,\,LOSS}$, to said desired output power, $y_d$, wherein said calibration constant, $A_{TX,\,LOSS}$ is indicative of a loss between a point where said final transit power is measured and an antenna for transmitting said final output signal, $w_o$.

35. The method recited in claim 19 further comprising the steps of:

adding an transmit power ability factor, $P_{TX,\,ANALOG}$, indicating the maximum transmit power capability of said base station and the transmit power tracking gain, y' to obtain a corrected transmit power tracking gain; and adding said corrected transmit power gain and a breathing attenuation value, $A_{TX,\,BREATHING}$, to obtain a breathing corrected transmit power gain.

* * * * *